US010977018B1

(12) United States Patent
Hwang et al.

(10) Patent No.: US 10,977,018 B1
(45) Date of Patent: Apr. 13, 2021

(54) DEVELOPMENT ENVIRONMENT FOR HETEROGENEOUS DEVICES

(71) Applicant: Xilinx, Inc., San Jose, CA (US)

(72) Inventors: L. James Hwang, Portola Valley, CA (US); Michael Gill, Campbell, CA (US); Tom Shui, Mountain View, CA (US); Jorge E. Carrillo, San Jose, CA (US); Alfred Huang, Fremont, CA (US); Sudipto Chakraborty, Longmont, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/704,890

(22) Filed: Dec. 5, 2019

(51) Int. Cl.
  *G06F 9/44* (2018.01)
  *G06F 8/41* (2018.01)
  *G06F 8/30* (2018.01)

(52) U.S. Cl.
  CPC ............... *G06F 8/47* (2013.01); *G06F 8/315* (2013.01)

(58) Field of Classification Search
  CPC ....................................................... G06F 9/44
  See application file for complete search history.

(56) References Cited

U.S. PATENT DOCUMENTS

| 3,776,137 | A | 12/1973 | Abbott |
| 4,876,641 | A | 10/1989 | Cowley |
| 6,075,935 | A | 6/2000 | Ussery |
| 6,080,204 | A | 6/2000 | Mendel |
| 6,091,263 | A | 7/2000 | New et al. |
| 6,150,839 | A | 11/2000 | New et al. |
| 6,195,788 | B1 | 2/2001 | Leaver |
| 6,204,687 | B1 | 3/2001 | Schultz et al. |
| 6,462,579 | B1 | 10/2002 | Camilleri et al. |
| 6,526,557 | B1 | 2/2003 | Young et al. |

(Continued)

FOREIGN PATENT DOCUMENTS

EP 0910027 A2 10/1998

OTHER PUBLICATIONS

Xilinx, Inc., "Vitis Unified Software Platform," [online] retrieved from the Internet: <https://www.xilinx.com/products/design-tools/vitis/vitis-platform.html#documentation>, 12 pg.

(Continued)

*Primary Examiner* — Jae U Jeon
(74) *Attorney, Agent, or Firm* — Kevin T. Cuenot

(57) ABSTRACT

Implementing an application within a heterogeneous device can include receiving an application specifying a plurality of hardware accelerators and having a plurality of sections corresponding to different subsystems of the heterogeneous device, wherein the plurality of sections are specified using different programming models. Compiling each section based on the programming model of the section and the subsystem of the heterogeneous device corresponding to the section into an accelerator representation. Linking the accelerator representations based on a platform of the heterogeneous device, generating a hardware implementation of the application for the heterogeneous device based on the linked accelerator implementations, and automatically generating program code configured to control one or more of the plurality of hardware accelerators of the hardware implementation.

20 Claims, 8 Drawing Sheets

(56) References Cited

U.S. PATENT DOCUMENTS

| | | |
|---|---|---|
| 6,759,869 B1 | 7/2004 | Young et al. |
| 6,781,407 B2 | 8/2004 | Schultz |
| 6,810,514 B1 | 10/2004 | Alfke et al. |
| 6,836,842 B1 | 12/2004 | Guccione et al. |
| 6,907,595 B2 | 6/2005 | Curd et al. |
| 7,024,651 B1 | 4/2006 | Camilleri et al. |
| 7,057,413 B1 | 6/2006 | Young et al. |
| 7,124,338 B1 | 10/2006 | Mark et al. |
| 7,185,309 B1 | 2/2007 | Kulkarni et al. |
| 7,199,608 B1 | 4/2007 | Trimberger |
| 7,224,184 B1 | 5/2007 | Levi et al. |
| 7,281,093 B1 | 10/2007 | Kulkarni et al. |
| 7,301,822 B1 | 11/2007 | Walstrum, Jr. et al. |
| 7,302,625 B1 | 11/2007 | Payakapan et al. |
| 7,454,658 B1 | 1/2008 | Baxter |
| 7,328,335 B1 | 2/2008 | Sundararajan et al. |
| 7,380,035 B1 | 5/2008 | Donlin |
| 7,394,288 B1 | 7/2008 | Agarwal |
| 7,420,392 B2 | 9/2008 | Schultz et al. |
| 7,477,072 B1 | 1/2009 | Kao et al. |
| 7,478,357 B1 | 1/2009 | Mason et al. |
| 7,482,836 B2 | 1/2009 | Levi |
| 7,500,060 B1 | 3/2009 | Anderson et al. |
| 7,506,298 B1 | 3/2009 | Ingoldby |
| 7,509,617 B1 | 3/2009 | Young et al. |
| 7,518,396 B1 | 4/2009 | Kondapalli et al. |
| 7,521,961 B1 | 4/2009 | Anderson |
| 7,546,572 B1 | 6/2009 | Ballagh et al. |
| 7,574,680 B1 | 8/2009 | Kulkarni et al. |
| 7,576,561 B1 | 8/2009 | Huang |
| 7,619,442 B1 | 11/2009 | Mason et al. |
| 7,640,527 B1 | 12/2009 | Dorairaj et al. |
| 7,650,248 B1 | 1/2010 | Baxter |
| 7,653,820 B1 | 1/2010 | Trimberger |
| 7,689,726 B1 | 3/2010 | Sundararajan et al. |
| 7,724,815 B1 | 5/2010 | Raha et al. |
| 7,746,099 B1 | 6/2010 | Chan |
| 7,788,625 B1 | 8/2010 | Donlin et al. |
| 7,831,801 B1 | 11/2010 | Anderson |
| 8,006,021 B1 | 8/2011 | Li et al. |
| 8,020,163 B2 | 9/2011 | Nollet et al. |
| 8,045,546 B1 | 10/2011 | Bao et al. |
| 8,102,188 B1 | 1/2012 | Chan et al. |
| 8,122,396 B1 | 2/2012 | Antwerpen |
| 8,214,694 B1 | 7/2012 | McKechnie et al. |
| 8,250,342 B1 | 8/2012 | Kostamov et al. |
| 8,359,448 B1 | 1/2013 | Neuendorffer |
| 8,370,776 B1 | 2/2013 | Chan |
| 8,415,974 B1 | 4/2013 | Lysaght |
| 8,719,750 B1 | 5/2014 | Balzli, Jr. |
| 8,796,539 B2 | 8/2014 | Asaumi et al. |
| 8,928,351 B1 | 1/2015 | Konduru |
| 9,081,634 B1 | 7/2015 | Simkins et al. |
| 9,152,794 B1 | 10/2015 | Sanders et al. |
| 9,165,143 B1 | 10/2015 | Sanders et al. |
| 9,218,443 B1 | 12/2015 | Styles et al. |
| 9,230,112 B1 | 1/2016 | Peterson et al. |
| 9,323,876 B1 | 4/2016 | Lysaght et al. |
| 9,336,010 B2 | 5/2016 | Kochar et al. |
| 9,411,688 B1 | 8/2016 | Poolla et al. |
| 9,436,785 B1 | 9/2016 | Javre |
| 9,652,252 B1 | 5/2017 | Kochar et al. |
| 9,652,410 B1 | 5/2017 | Schelle et al. |
| 10,243,882 B1 | 3/2019 | Swarbrick |
| 2004/0114609 A1 | 6/2004 | Swarbrick et al. |
| 2004/0210695 A1 | 10/2004 | Weber et al. |
| 2007/0006137 A1 | 1/2007 | Savagaonkar |
| 2008/0082759 A1 | 4/2008 | Pong |
| 2008/0320255 A1 | 12/2008 | Wingard et al. |
| 2008/0320268 A1 | 12/2008 | Wingard et al. |
| 2009/0070728 A1 | 3/2009 | Solomon |
| 2009/0248598 A1* | 10/2009 | Burns ............... G06N 3/126 706/13 |
| 2009/0256836 A1* | 10/2009 | Fowler ............... G06T 15/506 345/419 |
| 2011/0307663 A1* | 12/2011 | Kultursay ............. G06F 30/30 711/125 |
| 2012/0036296 A1 | 2/2012 | Wingard et al. |
| 2012/0284501 A1 | 11/2012 | Zievers |
| 2012/0310983 A1 | 12/2012 | Mittal |
| 2013/0346953 A1 | 12/2013 | Chen |
| 2015/0109024 A1 | 4/2015 | Abdelfattah et al. |
| 2017/0140800 A1 | 5/2017 | Wingard et al. |
| 2017/0315944 A1 | 11/2017 | Mayer et al. |
| 2019/0238453 A1 | 8/2019 | Swarbrick et al. |
| 2019/0266125 A1 | 8/2019 | Swarbrick et al. |
| 2019/0303033 A1 | 10/2019 | Noguera Serra et al. |
| 2019/0303311 A1 | 10/2019 | Bilski et al. |
| 2019/0303323 A1 | 10/2019 | Swarbrick et al. |
| 2019/0303328 A1 | 10/2019 | Bilski et al. |

OTHER PUBLICATIONS

Xilinx, Inc., "Vitis Unified Software Platform Documentation, Embedded Software Development" UG1400 (v2019.2) Oct. 2019.

Xilinx, Inc., "Vitis Unified Software Platform Documentation, Application Acceleration Development," UG1393 (v2019.2) Oct. 2019.

Xilinx, Inc., "Flow Convergence During Hardware-Software Design for Heterogeneous and Programmable Devices," Gupta, et al., U.S. Appl. No. 16/421,439, 147 pg.

Xilinx, Inc., "Hardware-Software Design Flow for Heterogeneous and Programmable Devices ," Gupta, et al., U.S. Appl. No. 16/421,443, filed May 23, 2019, 146 pg.

Xilinx, Inc., Hardware-Software Design Flow With High-Level Synthesis for Heterogenous and Programmable Devices, Sastry et al. U.S. Appl. No. 16/421,444, filed May 23, 2019, 146 pg.

Xilinx, Inc., "Mapping a Dataflow Graph to a Plurality of Data Processing Engines," Gupta et al., U.S. Appl. No. 16/421,424, filed May 23, 2019, 67 pg.

ARM Limited, "AMBA 3 APB Protocol Specification," v1.0, Sep. 25, 2003, pp. 1-34, ARM Limited, Cambridge, UK.

ARM Limited, "AMBA 4 Axis-Stream Protocol SpecificaTIon," V1.0, Mar. 3, 2010, pp. 1-42, ARM Limited, Cambridge UK.

Bilski et al., "Device With Data Processing Engine Array", U.S. Appl. No. 15/944,307, filed Apr. 3, 2018, 123 pages, Xilinx, Inc., San Jose, CA, USA.

Xilinx, Inc., PCT International Application No. PCT/US2019/ 025414, Invitation to Pay Additional Fees, Communication Relating to the Results of the Partial International Search, and Provisional Opinion Accompanying the Partial Search Result, Jul. 5, 2019, 12 pg.

Dally, William J. et al., "Deadlock=Free Message Routing in Multiprocessor Interconnection Networks," IEEE Transactions on Computers, May 1987, pp. 547-553, vol. C-36, No. 5, IEEE, Piscataway, New Jersjey, USA.

Doud, B., "Accelerating the Data Plane With the Tile-MX Manycore Processor," Feb. 25, 2015, 19 pp., Linley Data Center Conference, EZChip Semiconductor, Inc., San Jose, California, USA.

Mellanox, EZchip, "Tile-Gx72 Processor," PB041, Feb. 14, 2015, 2 pp., EZchip Semiconductor, Inc., San Jose, California, USA.

Glass, Christopher et al., "The Turn Model for Adaptive Routing," Journal of the Association for Computing Machinery, Sep. 1994, pp. 874,902, vol. 41, No. 5, ACM, New York, New York, USA.

Kalray, "Deep Learning for High-Performance Embedded Applications," 19 pp., Kalray Inc., Los Altos, California, USA.

Kalray, "Kalray NVMe-oF Target Controller Solutions," Dec. 18, 20 17, 14 pp., Kalray Inc., Los Altos, California, USA.

Kalray, "MPPA Processors for Autonomous Driving," May 25, 2017, 18 pp., Kalray Inc., Los Altos, California, USA.

Mellanox,"BlueField Multicore System on Chip," copyright 2017, 4 pp., Mellanox Technologies, Sunnyvale, California, USA.

Mellanox, "NP-5 Network Processor," copyright 2017, 2 pp., Mellanox Technologies, Sunnyvale, California, USA.

ARM Limited, "AMBA AXI and ACE Protocol Specification," Jun. 16, 2003, pp. 1-306, ARM Limited, Cambridge, UK.

(56) References Cited

OTHER PUBLICATIONS

Noguera, J.J. et al., "Data Processing Engine Arrangement in a Device," U.S. Appl. No. 15/944,160, filed Apr. 3, 2018, 125 pg., Xilinx, Inc., San Jose, California, USA.

Rantala, Ville et al., "Network on Chip R outing Algorithms," TUCS Technical Report No. 779, Aug. 2006, pp. 1-38, Turku Centre for Computer Science, Turku, Finland.

Schooler, Richard, "Tile Processors: Many-Core for Embedded and Cloud Computing," Sep. 15, 2010, 35 pp., 14th Annual Workshop on High Performance Embedded Computing (HPEC '10).

Swarbrick et al., " End-To-End Quality-of-Service in a Network-on-Chip," U.S. Appl. No. 15/886,583, filed Feb. 1, 2018, Xilinx, Inc., San Jose, CA, USA.

Swarbrick et al., "Configurable Network-On-Chip for a Programmable Device", U.S. Appl. No. 16/041,473, filed Jul. 20, 2018, 34 pages, Xilinx, Inc., San Jose, CA, USA.

Swarbrick, et al., "Peripheral Interconnect for Configurable Slave Endpont Circuits," U.S. Appl. No. 15/936,916, filed Jul. 20, 2018, 42 pg., Xilinx, Inc., San Jose, CA, USA.

Swarbrick, et al., "ECC Proxy Extension and Byte Organization for Multi-Master Systems ," U.S. Appl. No. 16/106,691, filed Aug. 21, 2018, 31 pg., Xilinx, Inc., San Jose, CA, USA.

Swarbrick, et al., "Flexible Address Mapping for a NOC in an Integrated Circuit ," U.S. Appl. No. 15/964,901, filed Apr. 27, 2018, 28 pg., Xilinx, Inc., San Jose, CA, USA.

Swarbrick, et al., "Multi-Chip Structure Having Configurable Network-On-Chip ," U.S. Appl. No. 15/990,506, filed May 25, 2018, 33 pg., Xilinx, Inc., San Jose, CA, USA.

Swarbrick, et al., "Programmable NOC Compatible With Multiple Interface Communication Protocol," U.S. Appl. No. 15/904,211, filed Feb. 23, 2018, 27 pg., Xilinx, Inc., San Jose, CA, USA.

TIS Committee, Tool Interface Standard (TIS) Executable and Linking Format (ELF) Specification, Version 1.2, May 1995, 106 pg, Tool Interface Standard Committee.

Wentzlaff, David, et al., "On-Chip Interconnection Architecture of the Tile Processor," IEEE Micro, Nov. 12, 2007, pp. 15-31, vol. 27, Issue 5, IEEE Computer Society Press, Los Alamitos, California, USA.

Xilinx, Inc., PCT International Application No. PCT/US2019/025115, International Search Report and Written Opinion, dated Jun. 28, 2019, 16 pg.

Xilinx, "UltraScale Architecture DSP Slice," UG579, Oct. 18, 2017, 74 pp., Xilinx, Inc., San Jose, California, USA.

Xilinx, Inc., "AXI4-Stream Interconnect v1.1, LogiCORE IP Product Guide," PG035, Vivado Design Suite,Chap. 2: Product Specification, Chap. 3: Designing With the Core, Oct. 4, 2017, 44 pg., Xilinx, Inc., San Jose, California, USA.

Xilinx, Inc., "Zynq-7000 AP SoC—32 Bit DDR Access with ECC Tech Tip," 15 pg., printed on Aug. 10, 2018, <http://www.wiki.xilinx.com/Zynq-7000+AP+XoC+-+32+Bit+DDR+Access+with+ECC+Tech+Tip>, San Jose, CA, USA.

EZchip, "Tile-Gx72 Processor," Feb. 14, 2015, 2 pp., EZchip Semiconductor, Inc., San Jose, California, USA.

Kees Vissers: "Versal : New Xilinx Adaptive Compute Acceleration Platforms", Nov. 5, 2018 (Nov. 5, 2018), XP054980700, Retrieved from the Internet: URL:https://www.youtube.com/watch?v=aiPJij3ifvgv [retrieved on Jul. 16, 2020] the whole document.

Kia Bazargan et al: Xilinx Adaptive Compute Acceleration Platform : Versal TM Architecture, Proceedings of the 2019 ACM/SIGDA International Symposium on Field-Programmable Gate Arrays , FPGA 19, Feb. 20, 2019 (Feb. 20, 2019), pp. 84-93, XP055715259, New York, New York, USA DOI: 10.1145/3289602.3293906 ISBN: 978-1-4503-6137-8 the whole document.

Juanjo Noguera: "HW/SW Programmable Engine: Domain Specific Architecture for Project Everest", HotChips 30 (2018), Aug. 21, 2018 (Aug. 21, 2018), XP055715263, Retrieved from the Internet: URL:https://www.hotchips.org/hc30/2conf/2.03_Xilinx_Juanjo_XilinxSWPEHotChips20180819.pdf [retrieved on Jul. 15, 2020] the whole document.

Mefenza Michael et al: "Framework for rapid prototyping of embedded vision applications", Proceedings of the 2014 Conference on Design and Architectures for Signal and Image Processing, European Electronic Chips & Systems Design Initiat, Oct. 8, 2014 (Oct. 8, 2014), pp. 1-8, XP032781101, DOI: 10.1 109/DASIP . 2014.7115621 [retrieved on May 29, 2015] section III; figures 1, 2.

Xilinx: "Xilinx Zynq-7000 SoC", Jul. 29, 2014 (Jul. 29, 2014), pp. 1-8, XP055718465, Retrieved from the Internet: URL:https://www.xilinx.com/publications/prod_mktg/zynq-7000-generation-ahead-backgrounder.pdf [retrieved on Jul. 28, 2020] the whole document.

Kees Goossens et al: "A Design Flow for Application-Specific Networks on Chip with Guaranteed Performance to Accelerate SOC Design and Verification", Design, Automation, and Test in Europe Conference and Exhibition. Proceedings, IEEE Computer Society, US, Mar. 7, 2005 (Mar. 7, 2005), pp. 1182-1187, XP058405536, ISSN : 1530-1591, DOI: 10.1109/Date. 2005 .11 ISBN: 978-0-7695-2288-3 sections 2, 3.

* cited by examiner

400

Receive an application specifying a plurality of accelerators and having a plurality of sections corresponding to different subsystems of a programmable IC, wherein each section is specified using a different programming language and/or programming model
402

For each section, compiling the section, based on the programming model of the section and the subsystem of the programmable IC corresponding to the section, into an accelerator network representation
404

Link the accelerator network representations based on a hardware platform of the programmable IC
406

Generate a hardware implementation of the application for the programmable IC
408

Generate program code configured to control one or more of the plurality of accelerators of the hardware implementation.
410

FIG. 4

DEVELOPMENT ENVIRONMENT FOR HETEROGENEOUS DEVICES

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to a development environment for ICs that are heterogeneous devices.

BACKGROUND

Integrated circuits (ICs) can be implemented to perform a variety of functions. One variety of IC, referred to as a "heterogeneous device," includes two or more different types of subsystems. An example of a heterogeneous device is an IC that includes a first subsystem such as a processor system (PS) and a second subsystem such as programmable logic (PL). User designs for such a device typically have a software portion that is executed by the PS and a circuit design (e.g., an RTL design) portion that is implemented in the PL. Though both portions of the user design are ultimately implemented the same IC, each portion of the user design is handled separately through a distinct and independent development path.

SUMMARY

In one aspect, a method can include receiving an application specifying a plurality of hardware accelerators and having a plurality of sections corresponding to different subsystems of a heterogeneous device, wherein the plurality of sections are specified using different programming models. The method can include compiling each section into an accelerator representation based on the programming model of the section and the subsystem of the heterogeneous device corresponding to the section. The method also can include linking the accelerator representations based on a platform of the heterogeneous device, generating, using a processor, a hardware implementation of the application for the heterogeneous device based on the linked accelerator implementations, and automatically generating, using the processor, program code configured to control one or more of the plurality of hardware accelerators of the hardware implementation.

In another aspect, a system can include a processor configured to initiate operations. The operations include receiving an application specifying a plurality of hardware accelerators and having a plurality of sections corresponding to different subsystems of a heterogeneous device, wherein the plurality of sections are specified using different programming models. The operations include compiling each section into an accelerator representation based on the programming model of the section and the subsystem of the heterogeneous device corresponding to the section. The operations also can include linking the accelerator representations based on a platform of the heterogeneous device, generating a hardware implementation of the application for the heterogeneous device based on the linked accelerator implementations, and automatically generating program code configured to control one or more of the plurality of hardware accelerators of the hardware implementation.

In another aspect, a computer program product can include one or more computer readable storage media, and program instructions collectively stored on the one or more computer readable storage media. The program instructions are executable by computer hardware to initiate operations receiving an application specifying a plurality of hardware accelerators and having a plurality of sections corresponding to different subsystems of a heterogeneous device, wherein the plurality of sections are specified using different programming models. The operations include compiling each section into an accelerator representation based on the programming model of the section and the subsystem of the heterogeneous device corresponding to the section. The operations also can include linking the accelerator representations based on a platform of the heterogeneous device, generating a hardware implementation of the application for the heterogeneous device based on the linked accelerator implementations, and automatically generating program code configured to control one or more of the plurality of hardware accelerators of the hardware implementation.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 is an example method of operation for a development environment for a heterogeneous device.

DETAILED DESCRIPTION

Figure 1:
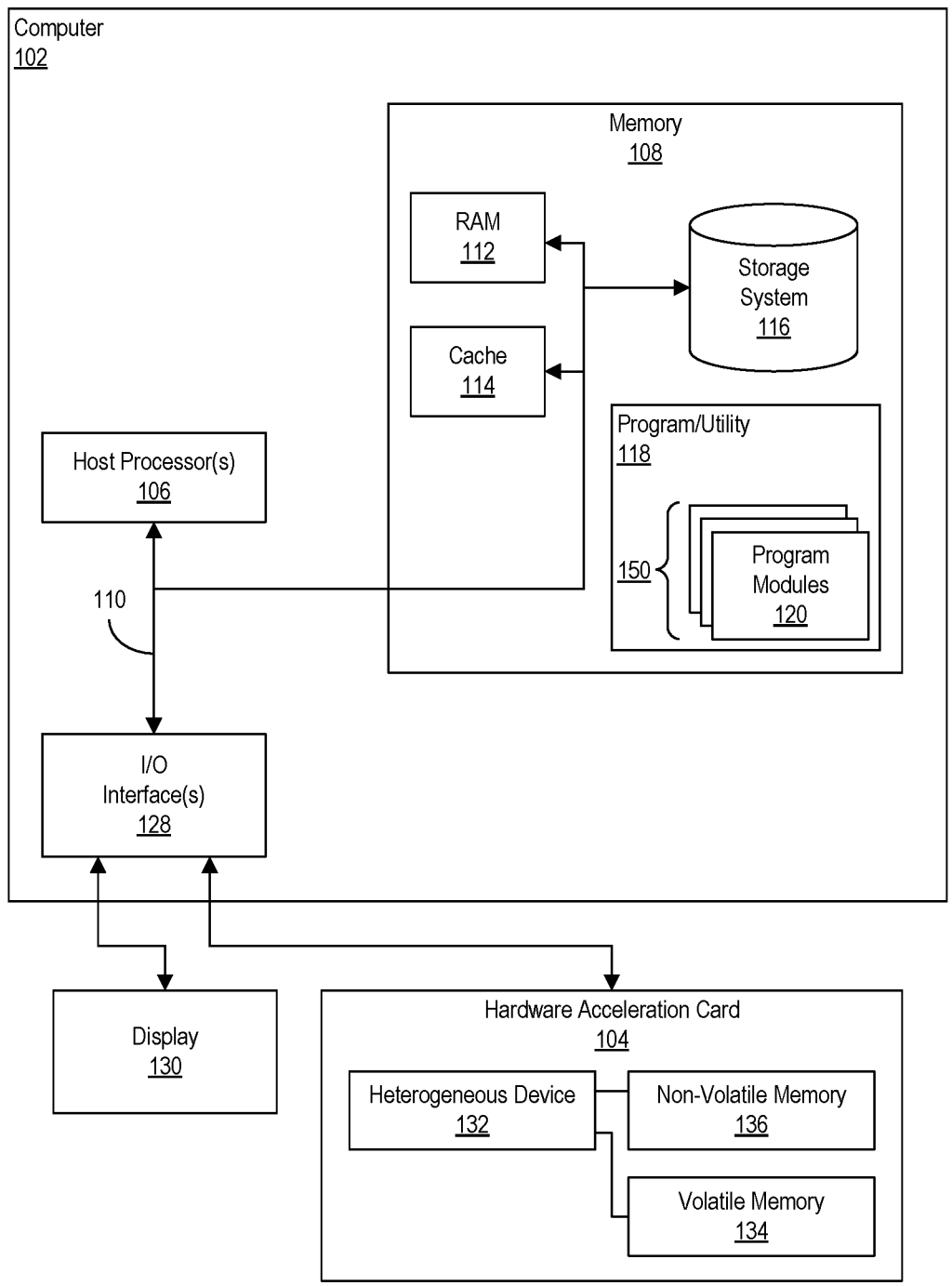
FIG. 1 illustrates an example computing system having a computer for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a development environment for ICs that are heterogeneous devices. A heterogeneous device refers to an IC that includes two or more different subsystems. A programmable IC (e.g., an IC having programmable logic therein) in combination with one or more other subsystems is an example of a heterogeneous device.

In accordance with the inventive arrangements described within this disclosure, a computer-based development environment is provided for implementing user software applications within a heterogeneous device. The heterogeneous device may include a variety of different fixed function subsystems and/or programmable subsystems that may be used by the user application in varying combinations. One or more of the subsystems, e.g., fixed function subsystems, may be application-specific circuitry.

The development environment is capable of compiling and linking the user application for implementation in the heterogeneous device. For example, the development environment is capable of inferencing particular hardware and/or data movers, performing synthesis, and integrating application-specific circuitry within the heterogenous device with the user application. The user application may include portions designated for (e.g., targeted to) different elements within the heterogeneous device. These different portions may be written using different programming languages and under different programming models. In one aspect, each distinct portion of the user application may be intended for implementation in a particular subsystem of the heterogeneous device or in a particular application-specific combination of the different subsystems available on the heterogeneous device.

The development environment is capable of compiling the user application using a uniform software architecture despite the use of different programming languages and/or models in specifying the user application. The development environment is capable of generating accelerator representations corresponding to different target subsystems of the heterogeneous device. The development environment is also capable of linking these different accelerator representations together through hardware channels and control software.

In one aspect, the accelerator representations are controlled by control program code (e.g., control software). The control program code may be implemented as executable program code (e.g., object code) that is capable of interfacing with the circuitry, e.g., hardware accelerators and/or data movers, implemented in the various subsystems of the heterogeneous device. In one aspect, the development environment is capable of automatically generating the control program code. In general, the development environment is capable of generating the control program code, based, at least in part, on the particular hardware that is specified by the user application and/or inferred from the user application.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing system 100 having a computer 102 (sometimes referred to herein as a "host" or "host system") for use with the inventive arrangements described within this disclosure. Computer 102 may include, but is not limited to, one or more processors 106 (e.g., central processing units), a memory 108, and a bus 110 that couples various system components including memory 108 to processor(s) 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures. Example bus structures include a memory bus, a peripheral bus, a graphics bus, and a processor or local bus. The bus structure may be implemented using any of a variety of available bus architectures. By way of example, and not limitation, such bus architectures include Peripheral Component Interconnect (PCI) bus, PCI Express (PCIe) bus, Advanced Microcontroller Bus Architecture (AMBA) Advanced Extensible Interface (AXI) bus, and/or other known buses.

Computer 102 typically includes a variety of computer readable media. Such media may be any available media that is accessible by computer 102 and may include any combination of volatile media, non-volatile media, removable media, and/or non-removable media.

Memory 108 may include computer readable media in the form of volatile memory, such as random-access memory (RAM) 112 and/or cache memory 114. Computer 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include one or more computer program products having a set (e.g., at least one) of program modules (e.g., program code) that are configured to carry out the functions and/or operations described within this disclosure.

For example, program/utility 118, having a set (at least one) of program modules 120 which may include, but are not limited to, an operating system, one or more application programs (e.g., user applications), other program modules, and/or program data, is stored in memory 108. Program modules 120 generally carry out the functions and/or methodologies as described herein at least with respect to operations performed by computer 102.

In one aspect, program modules 120 may implement a development environment 150 for a heterogeneous device. The development environment 150 may include one or more compilers capable of operating on high level program code (e.g., source code), hardware description language(s), and/or graphs to generate configuration data (e.g., one or more configuration bitstreams) and executable program code. Program modules 120, for example, may include software that is capable of performing a design flow (e.g., synthesis, placement, routing, and/or bitstream generation) on a circuit design and generating object code. In this regard, computer 102 serves as an example of an Electronic Design Automation (EDA) system that is capable of generating configuration bitstreams from user applications. The configuration data and executable program code may be loaded into a heterogeneous device 132 to implement the user application therein.

In another aspect, program modules 120 may also implement a software stack. The software stack, when executed by computer 102, may implement a runtime environment capable of performing operations described herein in communicating with hardware acceleration card 104 at runtime. For example, program modules 120 may include a driver or daemon capable of communicating with heterogeneous device 132. Thus, computer 102 may operate as a host that is capable of executing a runtime software system capable of connecting to hardware acceleration card 104.

In another example implementation, computer 102 is used for purposes of developing, e.g., compiling, the user application. Heterogeneous device 132 may include one or more processors therein providing a complete embedded system. In that case, the one or more processors of heterogeneous device 132 may execute the runtime software system such that the one or more processors embedded in heterogeneous device 132 operate as the host system or host processor as the case may be.

Program/utility 118 is executable by processor(s) 106. Program/utility 118 and any data items used, generated, and/or operated upon by processor(s) 106 are functional data structures that impart functionality when employed by processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 102 may include one or more Input/Output (I/O) interfaces 128 communicatively linked to bus 110. I/O interface(s) 128 allow computer 102 to communicate with external devices, couple to external devices that allow user(s) to interact with computer 102, couple to external devices that allow computer 102 to communicate with other computing devices, and the like. For example, computer 102 may be communicatively linked to a display 130 and to hardware acceleration card 104 through I/O interface(s) 128. Computer 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which computer 102 communicates with hardware acceleration card 104 is a PCIe adapter. Hardware acceleration card 104 may be implemented as a circuit board that couples to computer 102. Hardware acceleration card 104 may, for example, be inserted into a card slot, e.g., an available bus and/or PCIe slot, of computer 102.

Hardware acceleration card 104 includes heterogeneous device 132. Hardware acceleration card 104 also includes volatile memory 134 coupled to heterogeneous device 132 and a non-volatile memory 136 also coupled to heterogeneous device 132. Volatile memory 134 may be implemented as a RAM that is external to heterogeneous device 132, but is still considered a "local memory" of heterogeneous device 132, whereas memory 108, being within computer 102, is not considered local to heterogeneous device 132. In some implementations, volatile memory 134 may include multiple gigabytes of RAM. Non-volatile memory 136 may be implemented as flash memory. Non-volatile memory 136 is also external to heterogeneous device 132 and may be considered local to heterogeneous device 132.

FIG. 1 is not intended to suggest any limitation as to the scope of use or functionality of the examples described herein. Computer 102 is an example of computer hardware (e.g., a system) that is capable of performing the various operations described within this disclosure relating to implementing user applications and/or runtime interactions with hardware acceleration card 104 and/or heterogeneous device 132. Heterogeneous device 132, for example, may be implemented as a programmable IC.

Computer 102 is only one example implementation of a computer that may be used with a hardware acceleration card. Computer 102 is shown in the form of a computing device, e.g., a computer or server. Computer 102 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs and/or heterogeneous devices) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments and/or edge computing environments using computing system 100 or other suitable data processing system, generally support the FPGA-as-a-Service (FaaS) model. In the FaaS model, user functions are hardware accelerated as circuit designs implemented within programmable ICs and/or heterogeneous devices operating under control of the (host) data processing systems. Other examples of cloud computing models are described in the National Institute of Standards and Technology (NIST) and, more particularly, the Information Technology Laboratory of NIST.

Computer 102 is operational with numerous other general-purpose or special-purpose computing system environments or configurations. Examples of computing systems, environments, and/or configurations that may be suitable for use with computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
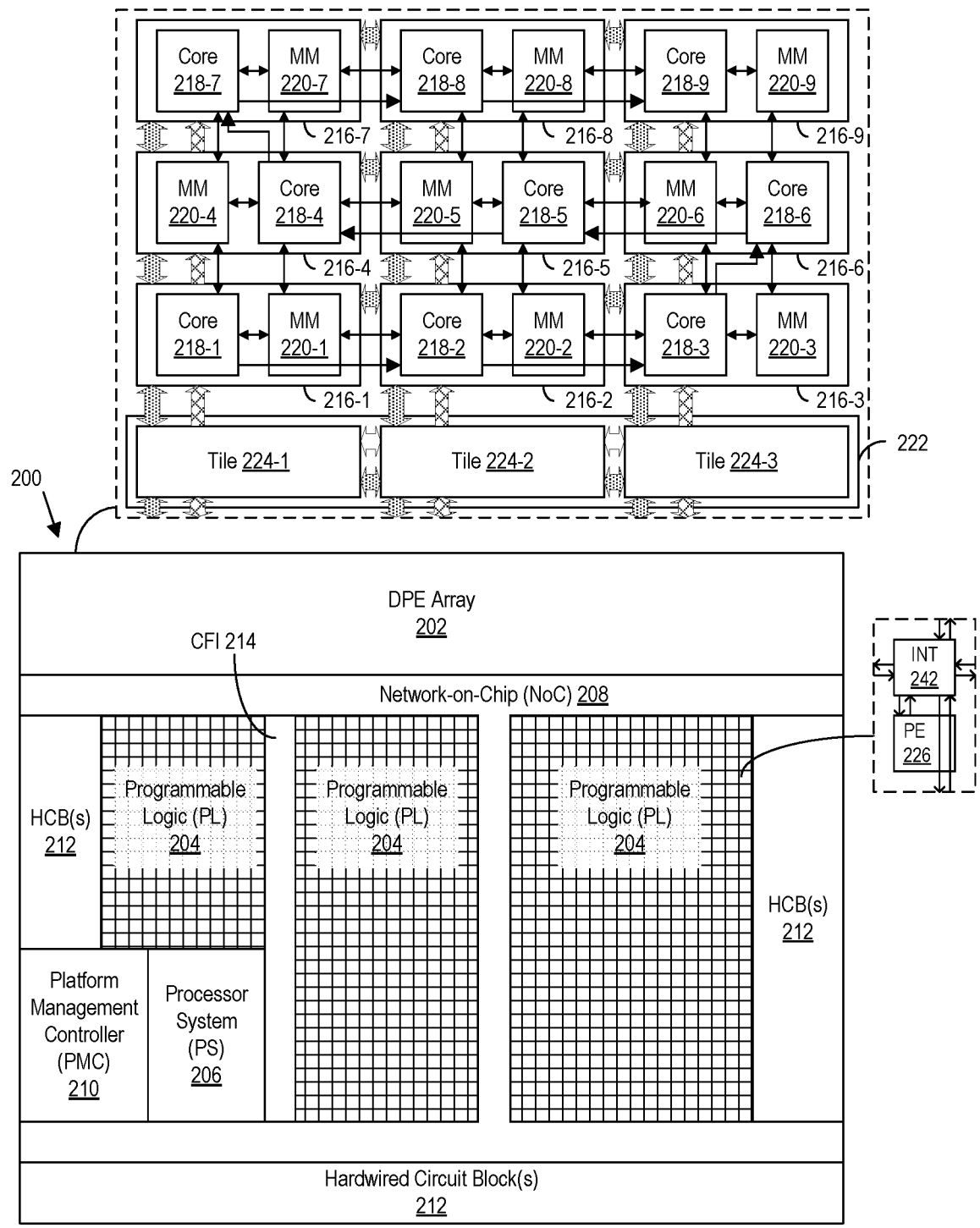
FIG. 2 illustrates an example architecture for a heterogeneous device.

FIG. 2 illustrates an example architecture 200 for heterogeneous device (device) 132. Architecture 200 may be used to implement a programmable IC and an adaptive system. In one aspect, architecture 200 may be used to implement a System-on-Chip (SoC). In the example of FIG. 2, architecture 200 is implemented on a single die provided within a single integrated package. In other examples, architecture 200 may be implemented using a plurality of interconnected dies where the various programmable circuit resources and/or subsystems illustrated in FIG. 2 are implemented across the different interconnected dies.

In the example, architecture 200 includes a data processing engine (DPE) array 202, programmable logic (PL) 204, a processor system (PS) 206, a Network-on-Chip (NoC) 208, a platform management controller (PMC) 210, and one or more hardwired circuit blocks (HCBs) 212. A configuration frame interface (CFI) 214 is also included. For purposes of discussion, each of DPE array 202, PL 204, PS 206, NoC 208, PMC 210, and each HCB 212 is an example of a subsystem of architecture 200.

DPE array 202 is implemented as a plurality of interconnected and programmable data processing engines (DPEs) 216. DPEs 216 may be arranged in an array and are hardwired. Each DPE 216 can include one or more cores 218 and a memory module (abbreviated "MM" in FIG. 2) 220. In one aspect, each core 218 is capable of executing program code stored in a core-specific program memory contained within each respective core (not shown). Each core 218 is capable of directly accessing the memory module 220 within the same DPE 216 and the memory module 220 of any other DPE 216 that is adjacent to the core 218 of the DPE 216 in the up, down, left, and right directions. For example, core 218-5 is capable of directly reading and/or writing (e.g., via respective memory interfaces not shown) memory modules 220-5, 220-8, 220-6, and 220-2. Core 218-5 sees each of memory modules 220-5, 220-8, 220-6, and 220-2 as a unified region of memory (e.g., as a part of the local memory accessible to core 218-5). This facilitates data sharing among different DPEs 216 in DPE array 202. In other examples, core 218-5 may be directly connected to memory modules 220 in other DPEs.

DPEs 216 are interconnected by programmable DPE interconnect circuitry. The programmable DPE interconnect circuitry may include one or more different and independent networks. For example, the programmable DPE interconnect circuitry may include a streaming network formed of streaming connections (shaded arrows), a memory mapped network formed of memory mapped connections (cross-hatched arrows).

Loading configuration data into control registers of DPEs 216 by way of the memory mapped connections allows each DPE 216 and the components therein to be controlled independently. DPEs 216 may be enabled/disabled on a per-DPE basis. Each core 218, for example, may be configured to access the memory modules 220 as described or only a subset thereof to achieve isolation of a core 218 or a plurality of cores 218 operating as a cluster. Each streaming connection may be configured to establish logical connections between only selected ones of DPEs 216 to achieve isolation of a DPE 216 or a plurality of DPEs 216 operating as a cluster. Because each core 218 may be loaded with program code specific to that core 218, each DPE 216 is capable of implementing one or more different kernels therein.

In other aspects, the programmable DPE interconnect circuitry within DPE array 202 may include additional independent networks such as a debug network that is independent (e.g., distinct and separate from) the streaming connections and the memory mapped connections, and/or an event broadcast network. In some aspects, the debug network is formed of memory mapped connections and/or is part of the memory mapped network.

Cores 218 may be directly connected with adjacent cores 218 via core-to-core cascade connections. In one aspect, core-to-core cascade connections are unidirectional and direct connections between cores 218 as pictured. In another aspect, core-to-core cascade connections are bidirectional and direct connections between cores 218. In general, core-to-core cascade connections generally allow the results stored in an accumulation register of a source core to be provided directly to an input of a target or load core. Activation of core-to-core cascade interfaces may also be controlled by loading configuration data into control registers of the respective DPEs 216.

In an example implementation, DPEs 216 do not include cache memories. By omitting cache memories, DPE array 202 is capable of achieving predictable, e.g., deterministic, performance. Further, significant processing overhead is avoided since maintaining coherency among cache memories located in different DPEs 216 is not required. In a further example, cores 218 do not have input interrupts. Thus, cores 218 are capable of operating uninterrupted. Omitting input interrupts to cores 218 also allows DPE array 202 to achieve predictable, e.g., deterministic, performance.

SoC interface block 222 operates as an interface that connects DPEs 216 to other resources of architecture 200. In the example of FIG. 2, SoC interface block 222 includes a plurality of interconnected tiles 224 organized in a row. In particular embodiments, different architectures may be used to implement tiles 224 within SoC interface block 222 where each different tile architecture supports communication with different resources of architecture 200. Tiles 224 are connected so that data may be propagated from one tile to another bi-directionally. Each tile 224 is capable of operating as an interface for the column of DPEs 216 directly above.

Tiles 224 are connected to adjacent tiles, to DPEs 216 immediately above, and to circuitry below using the streaming connections and the memory mapped connections as shown. Tiles 224 may also include a debug network that connects to the debug network implemented in DPE array 202. Each tile 224 is capable of receiving data from another source such as PS 206, PL 204, and/or another HCB 212. Tile 224-1, for example, is capable of providing those portions of the data, whether application or configuration, addressed to DPEs 216 in the column above to such DPEs 216 while sending data addressed to DPEs 216 in other columns on to other tiles 224, e.g., 224-2 or 224-3, so that such tiles 224 may route the data addressed to DPEs 216 in their respective columns accordingly.

In one aspect, SoC interface block 222 includes two different types of tiles 224. A first type of tile 224 has an architecture configured to serve as an interface only between DPEs 216 and PL 204. A second type of tile 224 is has an architecture configured to serve as an interface between DPEs 216 and NoC 208 and also between DPEs 216 and PL 204. SoC interface block 222 may include a combination of tiles of the first and second types or tiles of only the second type.

PL 204 is circuitry that may be programmed to perform specified functions. As an example, PL 204 may be implemented as field programmable gate array (FPGA) type of circuitry. PL 204 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 204 is highly configurable unlike hardwired circuitry. Each programmable circuit block of PL 204 typically includes a programmable element 226 (e.g., a functional element) and a programmable interconnect 242. The programmable interconnects 242 provide the highly configurable topology of PL 204. The programmable interconnects 242 may be configured on a per wire basis to provide connectivity among the programmable elements 226 of programmable circuit blocks of PL 204 and is configurable on a per-bit basis (e.g., where each wire conveys a single bit of information) unlike connectivity among DPEs 216, for example.

Examples of programmable circuit blocks of PL 204 include configurable logic blocks having look-up tables and registers. Unlike hardwired circuitry described below and sometimes referred to as hard blocks, these programmable circuit blocks have an undefined function at the time of manufacture. PL 204 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 204, are numerous and intermingled with the other programmable circuit blocks of PL 204. These circuit blocks may also have an architecture that generally includes a programmable interconnect 242 and a programmable element 226 and, as such, are part of the highly configurable topology of PL 204.

Prior to use, PL 204, e.g., the programmable interconnect and the programmable elements, must be programmed or "configured" by loading data referred to as a configuration bitstream into internal configuration memory cells therein. The configuration memory cells, once loaded with a configuration bitstream, define how PL 204 is configured, e.g., the topology, and operates (e.g., particular functions performed). Within this disclosure, a "configuration bitstream" is not equivalent to program code executable by a processor or computer.

PS 206 is implemented as hardwired circuitry that is fabricated as part of architecture 200. PS 206 may be implemented as, or include, any of a variety of different processor types each capable of executing program code. For example, PS 206 may be implemented as an individual processor, e.g., a single core capable of executing program code. In another example, PS 206 may be implemented as a multi-core processor. In still another example, PS 206 may include one or more cores, modules, co-processors, I/O interfaces, and/or other resources. PS 206 may be implemented using any of a variety of different types of architectures. Example architectures that may be used to implement PS 206 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code. In one aspect, PS 206 may include one or more application processors and one or more real-time processors.

NoC 208 is a programmable interconnecting network for sharing data between endpoint circuits in architecture 200. The endpoint circuits can be disposed in DPE array 202, PL 204, PS 206, and/or selected HCBs 212. NoC 208 can include high-speed data paths with dedicated switching. In an example, NoC 208 includes one or more horizontal paths, one or more vertical paths, or both horizontal and vertical path(s). The arrangement and number of regions shown in FIG. 2 is merely an example. NoC 208 is an example of the common infrastructure that is available within architecture 200 to connect selected components and/or subsystems.

Within NoC 208, the nets that are to be routed through NoC 208 are unknown until a user application is created for implementation within architecture 200. NoC 208 may be programmed by loading configuration data into internal configuration registers that define how elements within NoC 208 such as switches and interfaces are configured and operate to pass data from switch to switch and among the NoC interfaces to connect the endpoint circuits. NoC 208 is fabricated as part of architecture 200 (e.g., is hardwired) and, while not physically modifiable, may be programmed to establish connectivity between different master circuits and different slave circuits of a user application. NoC 208, upon power-on, does not implement any data paths or routes therein. Once configured, e.g., by PMC 210, however, NoC 208 implements data paths or routes between endpoint circuits.

PMC 210 is responsible for managing architecture 200. PMC 210 is a subsystem within architecture 200 that is capable of managing the programmable circuit resources across the entirety of architecture 200. PMC 210 is capable of maintaining a safe and secure environment, booting architecture 200, and managing architecture 200 during operation. For example, PMC 210 is capable of providing unified and programmable control over power-up, boot/configuration, security, power management, safety monitoring, debugging, and/or error handling for the different programmable circuit resources of architecture 200 (e.g., DPE array 202, PL 204, PS 206, and NoC 208). PMC 210 operates as a dedicated platform manager that decouples PS 206 and from PL 204. As such, PS 206 and PL 204 may be managed, configured, and/or powered on and/or off independently of one another.

In one aspect, PMC 210 is capable of operating as a Root-of-Trust for the entirety of architecture 200. As an example, PMC 210 is responsible for authenticating and/or validating device images containing configuration data and/or program code for any of the programmable resources of architecture 200 that may be loaded into architecture 200. PMC 210 further is capable of protecting architecture 200 against tampering during operation. By operating as the Root-of-Trust for architecture 200, PMC 210 is capable of monitoring operation of PL 204, PS 206, and/or any other programmable circuit resources that may be included in architecture 200. The Root-of-Trust capabilities, as performed by PMC 210, are distinct and separate from PS 206 and PL 204 and/or any operations performed by the PS 206 and/or PL 204.

In one aspect, PMC 210 is operated on a dedicated power supply. As such, PMC 210 is powered by a power supply that is separate and independent from the power supply of PS 206 and the power supply of PL 204. This power independence allows PMC 210, PS 206, and PL 204 to be protected from one another in terms of electrical noise and glitches. Further, one or both of PS 206 and PL 204 may be powered down (e.g., suspended or placed in hibernate mode) while PMC 210 continues to operate. This capability allows any portions of architecture 200, e.g., PL 204, PS 206, NoC 208, etc., that have been powered down to wake and be restored to an operational state more quickly and without the need for the entirety of architecture 200 to undertake a complete power-up and boot process.

PMC 210 may be implemented as a processor with dedicated resources. PMC 210 may include multiple redundant processors. The processors of PMC 210 are capable of executing firmware. Use of firmware (e.g., executable program code) supports configurability and segmentation of global features of architecture 200 such as reset, clocking, and protection to provide flexibility in creating separate processing domains (which are distinct from "power domains" that may be subsystem-specific). Processing domains may involve a mixture or combination of one or more different programmable circuit resources of architecture 200 (e.g., wherein the processing domains may include different combinations or devices from DPE array 202, PS 206, PL 204, NoC 208, and/or other HCB(s) 212).

HCBs 212 include special-purpose circuit blocks fabricated as part of architecture 200. Though hardwired, HCBs 212 may be configured by loading configuration data into control registers to implement one or more different modes of operation. Examples of HCBs 212 may include input/output (I/O) blocks, transceivers for sending and receiving signals to circuits and/or systems external to architecture 200, memory controllers, or the like. Examples of different I/O blocks may include single-ended and pseudo differential I/Os. Examples of transceivers may include high-speed differentially clocked transceivers. Other examples of HCBs 212 include, but are not limited to, cryptographic engines, digital-to-analog converters (DACs), analog-to-digital converters (ADCs), and the like. In general, HCBs 212 are application-specific circuit blocks.

CFI 214 is an interface through which configuration data, e.g., a configuration bitstream, may be provided to PL 204 to implement different user-specified circuits and/or circuitry therein. CFI 214 is coupled to and accessible by PMC 210 to provide configuration data to PL 204. In some cases, PMC 210 is capable of first configuring PS 206 such that PS 206, once configured by PMC 210, may provide configuration data to PL 204 via CFI 214. In one aspect, CFI 214 has a built in cyclic redundancy checking (CRC) circuitry (e.g., CRC 32-bit circuitry) incorporated therein. As such, any data that is loaded into CFI 214 and/or read back via CFI 214 may be checked for integrity by checking the values of codes attached to the data.

The various programmable circuit resources illustrated in FIG. 2 may be programmed initially as part of a boot process for architecture 200. During runtime, the programmable circuit resources may be reconfigured. In one aspect, PMC 210 is capable of initially configuring DPE array 202, PL 204, PS 206, and NoC 208. At any point during runtime, PMC 210 may reconfigure all or a portion of architecture 200. In some cases, PS 206 may configure and/or reconfigure PL 204 and/or NoC 208 once initially configured by PMC 210.

In another aspect, a heterogeneous device includes dedicated on-chip circuitry that exposes I/O interfaces (e.g., AXI bus interfaces or other communication bus interfaces) to other portions of the heterogeneous device. For example, referring to the example of FIG. 2, architecture 200 may include dedicated on-chip circuitry that exposes AXI interfaces to DPE array 202, PL 204, NoC 208, DSP blocks in PL 204, HCBs 212, and/or other programmable I/O included in architecture 200. Development environment 150, as described within this disclosure, is capable of providing a uniform mechanism for programming such accelerator systems that include such dedicated on-chip circuitry whether the host processor (e.g., the host system) is part of a distinct host computer (e.g., computer 102 of FIG. 1) or is implemented as one or more processors embedded in heterogeneous device 132 (e.g., PS 206).

FIG. 2 is provided as an example of a heterogeneous device. In other examples, particular subsystems such as PS 206 may be omitted. For example, a heterogeneous device may include DPE array 202 in combination with PL 204. In another example, a heterogeneous device may include DPE array 202 in combination with NoC 208 and PL 204. One or more HCB(s) also may be included in the alternative examples described.

Figure 3:
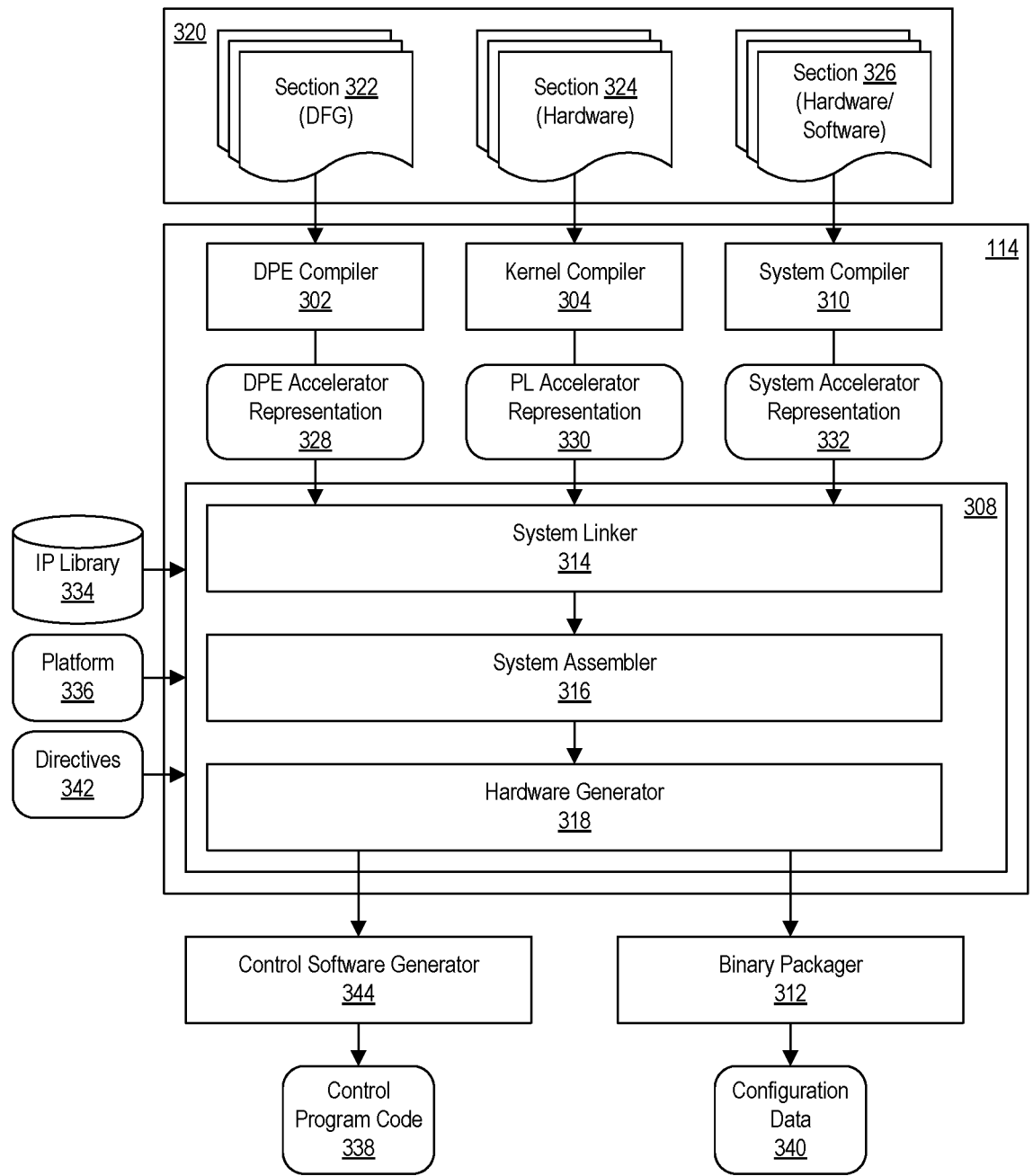
FIG. 3 illustrates an example software architecture for a development environment for a heterogeneous device.

FIG. 3 illustrates an example software architecture for implementing development environment 150. Development environment 150 may be used to process a user application for implementation within a particular target device. Within this disclosure, the term "target device" means a particular heterogeneous device having a particular architecture for which a user application is being processed for implementation therein. In the example of FIG. 3, development environment 150 includes a plurality of compilers 302, 304, and 310; a linker 308, a control software generator 344, and a binary packager 312. Linker 308 incudes a system linker 314, a system assembler 316, and a hardware generator 318.

Development environment 150 is capable of processing a user application 320 to generate a combination of control program code 338 and configuration data 340. Configuration data 340 is used to configure a target device to implement user application 320 therein. In one aspect, control program code 338 is executable program code that may be linked into the user's program code that is to be executed by a host processor. The host processor may be located within an external system (e.g., processor(s) 106 of FIG. 1) or implemented as one of the processors available in PS 206 if included in the target device. In another aspect, control program code 338 may be executable program code (e.g., object code) that is loaded into the target device at boot time and that is executed as part of booting the target device.

Configuration data 340 refers to configuration bitstream(s) used to implement circuitry in PL 204 and any data that may be loaded into control registers of the target device to control configurable/programmable aspects of any of the subsystems therein (e.g., DPE array 202, PS 206, NoC 208, and/or HCB(s) 212). For example, configuration data 340 may include control register data used to specify particular types of packet handling to be used by direct memory access (DMA) engine(s) in DPE array 202, particular logical connections between DPEs, particular operational modes of memory controllers and/or other HCBs 212, and/or data used to program the dedicated on-chip circuitry that exposes I/O interfaces of architecture 200.

In the example of FIG. 3, user application 320 is provided to development environment 150. User application 320 specifies a plurality of different hardware accelerators. User application 320 includes a plurality of different sections 322, 324, and 326. Each of sections 322, 324, and 326 may be implemented using a particular or different programming language under a different programming model.

A programming model refers to a programming abstraction used to express computation. The programming model often specifies computation (e.g., algorithms and data structures) through function and library calls with underlying execution, memory model, and data types. The memory model may reflect, at least in part, the underlying hardware. For example, the memory model may be for a shared memory and/or for a non-uniform memory architecture. The data types may include basic data types and/or user-defined types such as C++ classes. Examples of programming models include sequential programming in C++, POSIX threads, OpenMP, synchronous data flow, OpenCL, and stream programming (e.g., actors that communicate via streams).

Each of sections 322, 324, and 326 may include one or more files. In one aspect, the different sections 322, 324, and 326 of user application 320 correspond to different subsystems and/or combinations of subsystems of the target device. For example, section 322 corresponds to DPE array 202. Section 324 corresponds to PL 204. Section 326 corresponds to hardware accelerators that may be implemented in any of the various subsystems of device 132 and the host processor.

In general, each of DPE compiler 302, kernel compiler 304, and system compiler 310 is capable of processing a different section of user application 320. For example, DPE compiler 302 is capable of compiling section 322 to generate DPE accelerator representation 328 corresponding to DPE array 202. Kernel compiler 304 is capable of compiling section 324 to generate PL accelerator representation 330 corresponding to PL 204. System compiler 310 is capable of compiling section 326 to generate system accelerator representation 332 corresponding to the host processor and the hardware accelerators of the user application 320.

Section 322 specifies one or more hardware accelerators (e.g., kernels) to be implemented in DPE array 202. Section 322 may also specify connectivity between certain ones of the hardware accelerators to be implemented in DPE array 202 and one or more other hardware accelerators to be implemented in PL 204. In one aspect, section 322 uses a stream programming model with reference to a memory model corresponding to the memory architecture described in connection with the DPE array. The programming model may be expressed as a Data Flow Graph (DFG). For example, section 322 is implemented as a DFG that includes a plurality of nodes. Each node represents a computation, which corresponds to a function (e.g., a hardware accelerator) as opposed to a single instruction. The nodes are interconnected by edges that represent data flows (e.g., streams). The hardware implementation of a node may only execute in response to receiving data from each of the inputs to that node. Nodes generally execute in a non-blocking manner. Section 322 represents a parallel specification to be implemented in the target subsystem as opposed to a sequential program for execution.

In one example, section 322 is specified in a high-level programming language (HLL) such as C and/or C++. As noted, though specified in an HLL, which is conventionally used to create sequential programs, section 322, being a DFG, is a parallel specification. Development environment 150 is capable of providing a class library that is used to build data flow graphs and, as such, section 322. The class library may be implemented as a helper library with pre-defined classes and constructors for graphs, nodes, and edges that can be used to build section 322.

The DFG is defined by the user. DPE compiler 302 compiles section 322 onto DPE array 202 of the target device. For example, the DFG of section 322 includes a plurality of interconnected nodes where each node of the DFG is designated, e.g., annotated with metadata, for implementation within DPE array 202 or within PL 204. DPE compiler 302 is capable of mapping those nodes of the DFG designated for implementation in DPE array 202 to a particular DPE in DPE array 202. The DFG, by including references to nodes to be implemented in PL 204, specifies connectivity between hardware accelerators in DPE array 202 and hardware accelerators in PL 204.

In one aspect, the DFG includes one or more constraints provided by the user. The constraints may specify which particular DPEs hardware accelerators (of those to be implemented in the DPE array 202) are to be implemented or a region of DPEs to be used. Constraints may also specify, for those hardware accelerators implemented in a DPE that communicate with circuitry external to DPE array 202 (e.g., PL 204 and/or other subsystems), which particular communication channel(s) through SoC interface block 222 (e.g., tiles and/or channels in the tile) are to be used by each such hardware accelerator.

DPE compiler 302 generates DPE accelerator representation 328, which may include one or more files. DPE accelerator representation 328 may be provided to linker 308 and, more particularly, to system linker 314. DPE accelerator representation 328 may include one or more components such as, for example, a graph, configuration data, and metadata. The graph of DPE accelerator representation 328 specifies connectivity between hardware accelerators implemented in DPE array 202. The graph may be in a different format than originally expressed in section 322. The graph may also specify which DPE each of the various hardware accelerators in section 322 (designated for implementation in DPE array 202) is assigned. The graph further may indicate the particular tiles and channel(s) in the tile(s) to which data flows into and out from the DPE array 202 are assigned within SoC interface block 222. DPE compiler 302 is capable of following any user provided constraints as to placement of kernels into particular DPEs and/or use of particular tiles and/or channels of SoC interface block 222.

The configuration data of DPE accelerator representation 328, when loaded into DPE array 202, is capable of programming components therein to establish connectivity between those DPEs in DPE array 202 that are to communicate with one another and/or configuration data for establishing the communication channels through SoC interface block 222 to other subsystems of the target device (e.g., NoC 208, PL 204, PS 206, and/or other HCBs 212).

In one aspect, the metadata may be provided as one or more files that are independent of (e.g., distinct from) the graph and/or configuration data. In another aspect, metadata may be embedded within the graph. In general, metadata is used by linker 308 to determine hardware and/or software connectivity and consistency across the different programming abstractions (e.g., sections 322, 324, and/or 326). Such metadata, which drives implementation and mapping of user application 320, may be passed to linker 308 through program code (e.g., C++ classes per system compiler) whether embedded in a graph or provided as separate file(s). Metadata may also be provided as one or more linker directives (e.g., directives 342). Linker 308 is capable of using metadata, despite how specified, in a uniform manner. Further, any directives that are specified, e.g., as user constraints, may be applied at the kernel level (e.g., to nodes in a graph or to individual accelerators) and/or at the network level (e.g., to an explicit graph or to an implicit network determined based on program caller/callee data flow(s) as described hereinbelow).

Examples of metadata that may be specified for one or more of the various sections of the user application and/or accelerator representations can include, but are not limited to:

Mappings of a software abstraction of the user application (e.g., a kernel interface similar to a function prototype with formal arguments) onto a hardware IP implementation (e.g., of IP library 334). For example, the mapping may map the software abstraction onto port mappings and register mappings (address offsets with respect to the IP's base address and/or register names).

Clock frequency directives used to drive the system generation process.

Directives to instance a multiplicity of IP realizations for a specific kernel in the graph, where the generated system automatically schedules kernel operations specified in the graph onto the multiplicity of implemented IP instances.

Physical location directives. For example, in the case of the PL, a physical location directive may specify that a particular IP instance be placed in a specific die of a multi-die heterogeneous device (where the die is sometimes referred to as a super logic region) or a particular location within the die and/or subsystem of the die. In the case of the DPE array, a physical location directive may specify a particular column and/or row or range of columns and/or rows of DPEs within which to implement nodes of the graph.

Time-division multiplexing directives specify kernels to be realized in distinct partitions (slots) within a reconfigurable platform (partial reconfiguration region). Time-division multiplexing directives indicate that a particular kernel or group of kernels are to be implemented in a partial reconfiguration region of the target device so that the kernels may be removed and others implemented in their place using dynamic partial reconfiguration of the partial reconfiguration region. The partial reconfiguration region may be implemented using portions of one or more or each of the PL, PS, NoC, and DPE array.

Memory property directives. For example, a memory property directive may be used to specify whether a memory is cacheable or non-cacheable. This designation imposes distinct implementation optimization opportunities. Another example of a memory property designates whether a memory is contiguous or non-contiguous, which imposes distinct data movement requirements.

Section 324 is a collection, e.g., a plurality, of hardware accelerators to be implemented in PL 204. Whereas section 322 may include a reference to one or more particular hardware accelerators designated for implementation in PL 204 that are in communication with DPE array 202 to specify connectivity, section 322 does not include the source code for the hardware accelerators themselves at least with respect to the hardware accelerators to be implemented in PL 204. Section 324 may specify the source code for each hardware accelerator in communication with DPE array 202 and/or source code for any other additional hardware accelerators to be implemented in PL 204 that may not be in communication with DPE array 202 (e.g., hardware accelerators that operate on a standalone basis and/or interact with subsystems other than DPE array 202). In one aspect, section 324 is specified using a sequential programming model with reference to a memory model corresponding to the PL 204 and/or any RAMs that may be accessed by circuitry implemented in the PL 204 (e.g., by way of memory controller). For example, each of the hardware accelerators of section 324 is specified using an HLL such as C and/or C++.

In an example implementation, kernel compiler 304 processes the source code for each hardware accelerator by performing high-level synthesis. Kernel compiler 304 is capable of generating a register transfer level (RTL) version of each hardware accelerator of section 324 for implementation in PL 204. In this regard, PL accelerator representation 330 includes an RTL implementation for each hardware accelerator of section 324 initially specified in an HLL.

Kernel compiler 304 provides PL accelerator representation 330 to linker 308 and, more particularly, to system linker 314. PL accelerator representation 330 is a collection of two or more RTL implementations of hardware accelerators and does not specify interconnections between the hardware accelerators.

Section 326 may include at least a portion of host program code and/or hardware accelerator program code. In one aspect, section 326 is specified in a caller-callee programming model that may be specified using an HLL. For example, the program code may include caller functions and callee functions (functions called by the caller functions). The caller functions generally correspond to host program code, whether executed in an external processor such as processor 106 of FIG. 1 or a processor within or embedded in the target device (e.g., a processor of PS 206).

In one aspect, as implemented by system compiler 310, the caller-callee programming model implements a variation of sequential C++ function call semantics that uses automatic thread inference for cascaded (in hardware, pipelined) function calls. At the entrance and exit of function pipelines, C++ function call semantics are preserved. Within a pipeline, function execution is concurrent.

In one aspect, the callee functions may be stub program code that is used to wrap the hardware accelerators. System compiler 310 is capable of compiling section 326 by analyzing the data flows between caller functions and the callee functions. System compiler 310 is capable of transforming section 326 into a network of nodes, e.g., system accelerator representation 332, representing the caller-callee functions. System accelerator representation 332 specifies data movement between the nodes (e.g., between the host processor and the hardware accelerators).

In one aspect, system compiler 310 is capable of analyzing the data flows and inferring data movers to facilitate data transfers in the target device between the nodes as implemented therein. System compiler 310 is capable of inferring data movers by analyzing the data flows between pairs of two nodes (e.g., a caller function and the callee function called by the caller function) and determining a particular type of data mover to be used for the data transfers between the two nodes based on the attributes of the data flow. In the example of FIG. 3, system compiler 310 is capable of inferring the data movers since the data movers are not explicitly specified in section 326. By comparison, the DFG of section 322 is capable of explicitly specifying logical connections within DPE array 202 and between DPE array 202 and other subsystems of the target device. The data movers selected effectively implement the function calls to the callee function. System complier 310, for example, may select a particular data mover from among a plurality of available data movers for each data transfer between nodes. Examples of data movers include DMA engines and first-in-first-out (FIFO) memories. Further examples of data movers are described below in connection with the connectivity framework.

In one example, system accelerator representation 332 specifies a combination of processor, data mover, and hardware accelerators that may coexist in PL 204. Both accelerator representations 332 and 328 specify general (e.g., logical) connectivity to a platform 336.

Platform 336 defines a hardware context and/or a software context available in the target device. Platform 336, for example, defines the particular subsystems that are available in the target device and attributes about the different subsystems. For example, platform 336 specifies whether the device includes a PS 206, a NoC 208, a PMC 210, a DPE array 202, and/or which types of HCB(s) 212 are available, if any.

In one aspect, platform 336 also provides a description of infrastructure circuitry of the target device that interacts with and/or connects to the circuitry on the circuit board on which the target device is coupled. One or more aspects of platform 336 may be synthesizable. Platform 336, for example, can specify the circuitry that is to be implemented within the target device that receives signals from outside of the device and that provides signals to systems and/or circuitry outside of the target device.

As an example, platform 336 may specify circuit resources such as a Peripheral Component Interconnect Express (PCIe) node for communicating with the computer 102, a memory controller or controllers for accessing volatile memory 134 and/or a non-volatile memory 136, and/or other resources such as internal interfaces coupling DPE array 202 and/or the PL 204 with the PCIe node. The circuitry specified by platform 336 is available for any application that may be implemented in the target device.

As another example, platform 336 may specify whether the target device includes a DPE array, the number of DPEs in the DPE array, and the row/column configuration of the DPE array including available communication channels through the SoC interface block. Platform 336 may specify whether the device includes a PS 206 or other embedded processor, the types of processors in PS 206 if included, and/or which, if any, operating systems are executed by such processor(s). Platform 336 refers to hardware and software of the target device that provides input/output and/or memory. Platform 336 defines a base functionality to which compilers 302, 304, and 310 effectively add additional functionality specified by the user application.

System linker 314 is capable of linking accelerator representations 328, 330, and 332 to platform 336. For example, system linker 314 is capable of logically connecting ports of accelerator representations 328 and 332 to one another and/or to ports of platform 336 depending on the connectivity specified by DPE accelerator representation 328 and system accelerator representation 332.

System linker 314, in performing the linking described, is capable of inserting any of the data movers that were determined (e.g., inferred) by system compiler 310. That is, while system compiler 310 determines the appropriate data mover to be used for the various data transfers between nodes of section 326, system linker 314 inserts data mover objects corresponding to the identified types of data movers into the linked user design (e.g., formed of accelerator representations 328, 330, and 332).

In another example implementation, system linker 314 may be configured to perform the inferencing of data movers previously described and attributed to system compiler 310. In that case, system linker 314 performs both the inferencing and insertion of data movers as part of the linking operations performed.

System linker 314 logically links the various ports based on the previously described connectivity. At this point, any data movers inserted are logical representations of such data movers. System assembler 316 is capable of packaging any of the hardware accelerators and data mover IPs for implementation in PL 204 for use by the hardware generator 318. For example, system assembler 316 is capable of replacing logical references to particular circuit blocks (e.g., data movers and/or other cores/IPs) with the actual circuit block implementations. In one aspect, system assembler 316 is capable of pulling the actual circuit block implementations (e.g., RTL for data movers) from IP library 334. System assembler 316 is further capable of packaging any custom IP (e.g., RTL generated from user specified HLL hardware accelerators) generated from high-level synthesis by kernel compiler 304. Packaging IP refers to the process of creating a package file or files that contains the software components needed to include the custom RTL into a design to be implemented in PL of the target device.

In one aspect, system linker 314 receives one or more directives 342. In one aspect, directives 342 specify particular options that system linker 314 follows in linking accelerator representations 328, 330, and 332. Directives may specify any of a variety of different types of information and, as such, belong to one of a plurality of different directive groups. In one aspect, a first directive group includes directives that are used by system linker 314 and indicate how system linker 314 links accelerator representations 328, 330, and 332 together. An example of a directive belonging to the first directive group is a directive specifying a constraint on a particular stream connection. Such a constraint may specify a particular data mover and attributes thereof for a particular connection. For example, a directive may indicate that a FIFO having a particular depth should be used to implement a connection between two nodes.

A second directive group includes directives that may be used by hardware generator 318. An example of a directive belonging to the second directive group is a placement constraint specifying that a particular hardware accelerator to be implemented in PL 204 be implemented in a particular location in PL 204 and/or in a particular die in the case where the target device includes a plurality of dies and more than one of the plurality of dies includes PL 204.

In one aspect, directives belonging to the second directive group may be identified by system linker 314 at least in part, and then passed on to hardware generator 318 for further implementation. In the example of the placement constraint specifying a particular die in which to implement a hardware accelerator, system linker 314 may, in response to receiving the directive, include an attribute within the RTL module corresponding to the hardware accelerator to which the directive corresponds. Hardware generator 318 may then detect the attribute for the RTL module and, when placing the design, ensure that the hardware accelerator is placed in the particular die specified by the constraint.

Another example of a directive of the second directive group may designate the hardware accelerator as one that exists in a partial reconfiguration region of PL 204. The directive is initially interpreted by system linker 314 as a logical constraint on the hardware accelerator. System linker 314 is capable of turning the logical constraint into a physical constraint that is added to the RTL module for the hardware accelerator which is passed on to hardware generator 318.

Another example of a directive belonging to the second directive group is one specifying that a port of a hardware accelerator that is connected to a memory be connected to a particular bank of the memory.

While one or more of directives 342 may be passed in to linker 308 for use by system linker 314 and/or hardware generator 318, constraints may also be specified directly within or in association with section 322 (e.g., in the DFG), in one or more of the HLL specified hardware accelerators of section 324, and/or in section 326. As an illustrative and non-limiting example, the DPE implementation of the user application (e.g., the DFG) may be restricted to implementation in a subset of the columns and/or rows of DPEs of DPE array 202. This may be expressed as a physical constraint in the DFG or passed to linker 308 within directives 342. DPE compiler 302 is capable of mapping the DFG into one or more DPEs that comply with the physical constraints. That is, DPE compiler 302 may map the DFG, or portions of the DFG (e.g., particular hardware accelerators) into the particular row(s) and/or column(s) of DPEs of DPE array 202 specified by the physical constraint. In general, system linker 314 is capable of transforming any received directives 342 into metadata for use by hardware generator 318 and/or control software generator 344.

In the case where one or more hardware accelerators in DPE array 202 (e.g., DPE hardware accelerators) communicate with hardware accelerators in PL 204 (e.g., PL hardware accelerators), the placement constraint from the DFG is also passed to hardware generator 318. For example, hardware generator 318, in order to achieve acceptable timing, places the PL hardware accelerator that couples to the DPE hardware accelerator at a location in PL 204 in proximity (e.g., within a predetermined distance to meet a timing constraint) to the column(s) of DPE array 202 in which the DPE hardware accelerator is located. In this example, a single placement constraint is utilized both by DPE compiler 302 and by hardware generator 318 and influences placement of components across more than one (e.g., two in this example) subsystems.

Hardware generator 318 is capable of processing the linked design after system assembler 316 incorporates the packaged IPs. Hardware generator 318 is capable of performing synthesis, placement, and routing for the portions of the design designated for implementation in PL 204.

Control software generator 344 is capable of generating control program code 338. In an example implementation, control software generator 344 is capable of receiving the metadata for different portions of the design. Based at least in part on the metadata, control software generator 344 is capable of generating control program code 338.

Once the user application has been processed through physical implementation tools such as hardware generator 318, information such as addresses of the different components (e.g., peripherals, hardware accelerators, and/or circuit blocks) on the target device are known. Further, connectivity of the components is known including types of data movers used. This information may be passed forward from the respective portions of development environment 150 as further metadata and used by control software generator 344. Information about the logical structure of user application 320 may be provided or passed forward from DPE compiler 302 and/or system compiler 310 as metadata to control software generator 344.

Regarding PL hardware accelerators, information about the particular hardware accelerators used (e.g., as determined by system assembler 316) such as addressing, whether the PL hardware accelerator is controlled by interrupt or by polling, and a particular control protocol used to control the hardware accelerator may be specified by metadata for the respective PL hardware accelerators. System assembler 316 is capable of providing metadata for the hardware accelerator implementations used within user application 320 to control software generator 344.

Another example of metadata includes data that may be used by the runtime or software stack in the host processor to communicate with hardware accelerators in the target device. In addition to addresses of hardware accelerators as previously mentioned, metadata may also specify the number of arguments a hardware accelerator may be provided as input(s) and/or offsets for different control registers within the hardware accelerator.

In another aspect, metadata may specify semantic information describing how certain hardware accelerators are controlled. For example, the runtime of the host processor may need to know the particular control protocol used to control the various hardware accelerators implemented in the target device. Examples of control protocols used by hardware accelerators implemented in PL 204 may include, but are not limited to, control handshake having a start signal and a done signal, control chain which supports multiple in-flight data requests, control none which utilizes self-synchronization streams and no explicit control protocol, and controller handshake where a controller is inserted in front of the accelerator to provide additional capabilities in terms of hardware command cues.

Accordingly, control software generator 344 analyzes the metadata and is capable of generating control program code 338 based on the metadata. As an illustrative example, control software generator 344 is capable of determining, from the metadata, that hardware accelerator A has connectivity to a memory that goes through a particular class of data mover. Control software generator 344 is capable of querying the metadata to determine that driver program code is needed that supports particular operations performed by hardware accelerator A. The driver, for example, is capable of delivering the input data to hardware accelerator A using the particular data mover connected to hardware accelerator A, and generating the necessary control signals to implement the particular control protocol used by hardware accelerator A. If, for example, the data mover for hardware accelerator A is a DMA engine, control program code 338 is generated to support multiple in-flight requests issued to hardware accelerator A.

The metadata specifying information such as the particular control protocol used by the hardware accelerator affects the control program code that is generated. For example, generating program code to support multiple in-flight requests is useful when the DMA engine is a data mover for a hardware accelerator that supports the control chain control protocol, but not for a hardware accelerator that supports the control handshake control protocol since such a hardware accelerator will not start a new task until the prior task is complete. Passing the metadata through from the various operations performed by development environment 150 allows control software generator 344 to generate control program code that is specifically suited to the resulting hardware implementation for the target device.

Binary packager 312 is capable of receiving the configuration data for the various subsystems of the target device including the configuration bitstreams. Binary packager 312 is capable of generating a binary file that may be loaded into the target device to physically configure the target device to implement the user's application in circuitry.

In another aspect, compilers and/or process flows may be added for generating object code for execution by cores of the DPE array and/or for generating object code for execution by the host processor. Such flows may be performed in parallel with those described in connection with FIG. 3 by such additional compiler(s).

In an example implementation, the development environment is capable of using an intermediate representation for specifying the accelerator representations generated by the respective compilers. The intermediate representation may also be used by the linker 308, e.g., by system linker 314, system assembler 316, and hardware generator 318. The intermediate representation may also be referred to as a "connectivity framework" in the description below.

Within the connectivity framework, a block represents an actor type (e.g., a class or type definition for a "unit of execution") that communicates via ports. An instance is an instantiation of a block that inherits properties of the block. A block can have multiple instances, and these instances may be implemented differently. An instance is mapped onto a physical component referred to as a "realization" by including a port map for each port of the instance. A connection is a point-to-point association between ports of two instances, and is used to communicate data (e.g., either payload or control information) from one instance to the other. A connection represents a data transfer that is realized by a data mover. A component represents a compute element that implements an instance. A component, like an instance, exposes only a port interface in a model being created. The component, however, may be implemented in a hierarchical manner such that the physical realization of the component in the target device has one or more ports mapped onto ports of sub-components of the component.

A model represents a computation system, e.g., a user application for implementation in a target device, and includes of a set of blocks (e.g., the types of actors), instances, components, and connections. A model can represent a logical network of blocks, instances, and connections. The compilers and linker of development environment 150 are capable of mapping the model onto components (e.g., of the target device). A model where instances map onto components results in a physical realization of the user application. The physical realization may require further processing outside of the connectivity model to be fully realizable in the target device. For example, interconnect IPs to perform hardware switching are not modeled explicitly in connectivity framework, other than through many-to-one and one-to-many connections.

In one aspect, the connectivity model may be expressed as an eXtensible Markup Language (XML) based description that provides an interchange format between the different portions of development environment 150. In another aspect, the connectivity model may be expressed using an HLL (e.g., C++) application programming interface (API) as previously described that may be used to build an in-memory model that can be operated upon by portions of development environment 150. The API may provide functions for performing reads and writes to the XML description. The API and XML are provided for purposes of illustration and not limitation. In other examples, the connectivity framework may be expressed using other formats such as JSON or a Domain Specific Language (DSL).

In general, a block represents an actor or a "unit of execution" type such as a hardware accelerator. The connectivity framework makes few assumptions on the internals of a block other than that communication with the block occurs through ports. A block can be specified by name, which is an alpha-numeric character string that is unique within a model and a port list with one or more port specifications.

Ports are the means by which block instances communicate with each other. A port specification can include a name, which is an alpha-numeric character string, a type, and type-specific parameters. In the connectivity framework, there are three types of logical ports. These include stream ports, addressable ports, and reference ports.

A stream port is a type of port used for sending and receiving streaming data between instances. Each stream port specifies the direction of data transfer which is either in or out.

An addressable port is a type of port used to access addressable memories within instances. Each addressable port can specify a mode that can be either master or slave, an address range that includes a base (e.g., an offset) and a region size. An offset may be defined with respect to a base address associated with the instance. Region size is the number of byte addresses in the memory space. For a master port, the address range defines the address range visible via the port. For a slave port, the address range defines the address segment visible via the port from within the corresponding master port's address range.

A reference port is a type of port that specifies a reference to a port on a sub-component of a hierarchical component. Each reference port specifies the underlying instance reference and underlying instance port.

The connection framework can be used to model software, in which case ports are purely software constructs that can be opened, closed, written to, and read from.

In addition to logical ports on blocks and instances, there are physical ports on components that correspond to ports on actual IP blocks. Examples of physical ports that may be specified within the connectivity framework include, but are not limited to, AXIMM—master and slave, AXIS—master and slave, AXI-Lite—master and slave, interrupt, clock, reset, BRAM, rtl_fifo, register, wire, ap_ctrl, and ap_ovld. Within the foregoing acronyms, "MM" stands for memory mapped while "S" stands for "streaming."

Within the connectivity framework, an instance represents an instantiation of a block and inherits all properties of the block. A block can have multiple instances, each of which may be implemented differently. An instance is specified by a name (e.g., an alpha-numeric character string), the name of the block of which it is an instance, optionally a component that implements the instance, and optionally a set of port maps to map instance ports onto component ports.

As noted, a connection refers to a point-to-point association for communication between two instance ports. A connection can include a source instance and source port, a destination instance and destination port, and a data mover that handles the data transmission. A connectivity framework data mover may involve a hardware component and a software library, e.g., a scatter-gather DMA that is realized with an IP block in hardware and a DMA driver in software.

Components support parameters which may be implemented as uninterpreted (key, value) pairs. The parameters are typically resolved outside of the connectivity framework (e.g., within the hardware generator to customize/parameterize IP blocks).

A mapping from an instance to a component requires that ports of the instance be mapped to the ports on the component. A port map captures port mapping as part of an instance specification and may include a port name of the Instance, a port name on the component to which the instance port is mapped, optionally another port called a control port to communicate any set-up or initialization information to the component instance, and optionally an address or offset either numeric or symbolic in case multiple logical ports are combined into one physical hardware port. The address or offset may be used to identify multiple logical streams corresponding to scalar variables being communicated over a single AXI-LITE port.

Data movers are used to transfer data between instances. Examples of data movers include a hardware component like AXI-DMA for software to hardware communication, a software library for software to software communication, a hardware direct connection for hardware stream connections (e.g., with optional hardware FIFO buffering). A data mover can include a name of a component that acts as a physical data mover. Examples include an AXI-DMA and an AXI-FIFO. In many cases, there is no explicit data mover and the data is moved by one of the CPUs in the system. The software library is capable of providing a lower-level, data-mover specific implementation of the connectivity framework API. Examples include device drivers for DMAs and a library used for inter-thread or inter-process communication.

Data movers may be categorized as for use with stream connections or addressable connections. Stream connection data movers include the following:

axi_dma_simple: This data mover is a simple DMA implemented by an axi_dma IP configured in Direct Mode. The axi_dma_simple supports a single memory mapped to stream or stream to memory mapped channel per IP instance.

axi_dma_sg: This data mover is a scatter-gather DMA implemented by the axi_dma IP configured in scatter-gather mode. The axi_dma_sg supports multiple memory map to stream logical and a single stream to memory map logical channel per IP instance. The axi_dma_sg is synchronized with software via interrupts.

axi_fifo: This data mover is a FIFO type of interface that supports CPU to stream communication with the axi_fifo_mm_s IP. The axi_fifo data mover supports a single memory map to stream or stream to memory map channel per IP instance.

axi_lite: This data mover supports CPU-initiated read/write transfers.

zero_copy: This data mover provides a shared memory abstraction where a CPU may pass a pointer to a hardware component. The hardware component then masters memory through an AXIMM master interface.

direct connection: This data mover is a direct AXI connection between components in hardware. No software component is required for a direct connection.

Examples of addressable connection type data movers include:

AXI-MM: This data mover is used with particular APIs such as "getbuf" and "setbuf" for addressable ports when the connection is realized as an AXI-Master to AXI-Slave connection.

AXI-LITE-ADDR: Like AXI-MM, this data mover is also used with getbuf and setbuf APIs for addressable ports but is used when the connection is realized as an AXI-Master to AXI-LITE connection.

Direct addressable connection: This data mover represents a direct addressable connection using AXI-Master/Slave ports between two hardware blocks.

Shared memory data mover for inter-thread software-software communication: This is used for inter-thread communication using addressable ports.

A block represents a hardware accelerator (e.g., a callee). The block port interface is derived from the function prototype with ports for every function argument, and a port to represent the hardware function control (when needed). There is an instance defined for each execution unit (hardware accelerator) for a callee block.

Development environment 150 is capable of analyzing the data flows of the user application, and when possible, create pipelines of hardware functions to avoid unnecessary round trips to memory. As a result, there may be multiple instances and implementations for a given callee. There is a connection between the peer ports for every caller/callee equivalence class for the user application. Development environment 150 is capable of determining an appropriate data mover for each such connection. Development environment 150 is capable of generating a linked representation of the user application, e.g., linking the accelerator representations, according to the model specified using the connectivity framework.

In one aspect, control software generator 344 is capable of generating control program code 338 as software stubs that implement the send/receive APIs to implement every hardware function call based on the data movers for the associated connections. These stub functions can be name spaced to avoid collision with the original functions. In linking control program code 338 with the user's application, callers within the user's application may be rewritten to call into the appropriate software stub rather than the original function. In one aspect, the original function definitions are unchanged; only the callers are intercepted to call the stub functions.

The connectivity framework implements a hardware system specification syntax for hardware topologies representable through program dataflows in an HLL with respect to the invocation of a set of hardware functions that is independent of the relevance of the program itself. In this syntax, the dataflow between a program and a set of hardware functions defines the model and the system topology.

FIG. 4 is an example method 400 of operation for a development environment for a heterogeneous device. Method 400 may be performed by a system, e.g., a computer, as described in connection with FIG. 1 executing a development environment. The development environment may have a software architecture as generally described in connection with FIG. 3.

In block 402, the system is capable of receiving an application specifying a plurality of accelerators and having a plurality of sections corresponding to different subsystems of a target device. The target device is a heterogeneous device. The sections of the application may be specified using different programming languages and/or different programming models. In one aspect, each section may be specified using a different programming language and/or a different programming model.

For example, a first section of the user application may be specified as a DFG. The DFG may be specified in an HLL. The DFG generally specifies the portion of the user application that is to be implemented in the DPE array. The DFG encapsulates the DPE array portion of the user application. The DFG specifies one or more hardware accelerators as nodes, where the nodes are annotated or designated for implementation in the DPE array or in the PL of the target device. A second section of the user application may be specified using an HLL. The second section of the user application can specify one or more of the hardware accelerators that are to be implemented in the PL of the target device. A third section of the user application may be specified as a series of caller and callee functions. The third section also may be specified in an HLL. While the second section defines the particular functionality of the hardware accelerators to be implemented in the PL, the third section defines data flows between the host processor and the various hardware accelerators, whether such hardware accelerators are implemented in the PL, in HCBs, or in the DPE array.

In block 404, for each section, the system is capable of compiling the section, based on the programming model and/or programming language of the section and the subsystem of the target device corresponding to the section, into an accelerator representation.

For example, the DPE compiler compiles the DFG to generate a DPE accelerator representation corresponding to the DPE array. The kernel compiler is capable of compiling the HLL hardware accelerators into a PL accelerator representation that includes an RTL version of each HLL hardware accelerator. The PL accelerator representation does not include connectivity information relating to the various RTL hardware accelerators. That is, the PL accelerator representation generated by the kernel compiler does not indicate which components of the target device to which each of the RTL hardware accelerators is connected. The system compiler is capable of compiling the caller-callee program code into a system accelerator representation specifying data flows between the host processor and the various hardware accelerators of the user application.

Taken collectively, the DPE, PL, and system accelerator representations specify different aspects of the user design. The DPE accelerator representation specifies implementation details of the hardware accelerators to be implemented in the DPE array. The PL accelerator representation specifies particular RTL versions of hardware accelerators to be implemented in the PL. The system accelerator representation specifies connectivity and data flows between the host processor and the various hardware accelerators of the user application implemented across the entirety of the device.

In one example implementation, each of the various compilers of the development environment is allocated a subset of the available resources of the target device for purposes of compiling the corresponding section of the user application. The subset allocated to each compiler may be non-overlapping such that the same resource or portion of a resource is not allocated to more than one compiler. The allocation of resources of the target device may be performed according to each of the hardware accelerators to be implemented within the target device.

For example, the various sections of the user application will indicate data flows such that connections between hardware accelerators and other target device resources such as memories and/or memory controllers may be determined. Regarding access to a memory such as an external memory available to the target device, the development environment may assign resources such as particular banks of the memory to different hardware accelerators on a round-robin type of basis. Similarly, connections between ports of each hardware accelerator and the memory may be allocated on a round-robin basis such that each hardware accelerator requiring access to a memory is given access to a port of a memory controller of the target device. This type of allocation of resources of the target device results in each compiler having a particular subset of the available resources of the target device available for use in compiling the relevant section of the user application.

In block 406, the system is capable of linking the accelerator representations based on a platform of the target device. For example, each different portion of the user application corresponding to a different subsystem can be connected to the platform for the target device. The platform may include circuitry to which the various sections of the user application connect within the heterogeneous device. In an illustrative and nonlimiting example, the platform for the target device may include a NoC and a memory controller. The NoC is used to implement data transfers between subsystems and/or certain hardware accelerators. The memory controller is used to connect ports of hardware accelerators to memory banks based on the data flows specified in the different sections of the user application. This may mean that the system links the hardware accelerators to other hardware accelerators and/or to available ports on the platform for the target device.

The linking performed by the system may also include inserting one or more data movers to implement data transfers and connections between different hardware accelerators and/or between hardware accelerators and the platform. As discussed, the system compiler is capable of determining which types of data movers are needed to implement different data transfers specified in the caller-callee program code. In one aspect, data mover types (e.g., streaming or memory mapped) may be selected based on the port attributes, e.g., streaming or memory addressable, of the nodes connected by a connection and/or the callee program code. During the linking phase, the system is capable of inserting any of the data movers previously determined and connecting the data movers to the respective ports of the hardware accelerators and/or the platform.

It should be appreciated that while the compilation and linking operations described herein relate to the heterogeneous device illustrated in FIG. 2, the development environment is extensible and that further compilation and linking operations may be performed as different subsystems are added to the heterogeneous device beyond those already described within this disclosure.

In one example implementation, as part of the linking described or in a subsequent operation, the system is capable of packaging any of the RTL versions of the hardware accelerators and/or data movers to be implemented in the PL.

In block 408, the system is capable of generating a hardware implementation of the application for the target device. In an example implementation, the system is capable of synthesizing, placing, and routing, the various hardware accelerators and data movers that are to be implemented in the PL based on the linked accelerator representations. In another aspect, the system is capable of generating configuration data including data to be written to control registers and/or one or more configuration bitstreams as the hardware implementation. The configuration data, when loaded into the target device, configures the target device to implement the user application therein across the subsystems. Executable program code for any processors and/or DPEs may be generated through other compilers and loaded into the target device.

In one example implementation, the system is capable of receiving one or more hardware directives. The system is capable of passing such hardware directive(s) to the hardware generator (e.g., to at least one of a synthesis engine, a placer, or a router of the hardware generator). The hardware generator may use the hardware directive to perform the generating of the hardware implementation.

In block 410, the system is capable of generating program code configured to control one or more of the plurality of accelerators of the hardware implementation. Block 410 may be performed by the system automatically. The system is capable of passing metadata generated by other components of the development environment forward for use by the control software generator. For example, metadata corresponding to the platform and the plurality of hardware accelerators may be passed through the compiling, linking, and generating of the hardware implementation for use in generating the control program code.

In one aspect, the metadata for the plurality of hardware accelerators specifies a selected control protocol from a plurality of control protocols used by each of the hardware accelerators. The system is capable of generating the program code to control the selected accelerator based, at least in part, on the selected control protocol. The system further generates the control program code based upon the particular data movers that have been inserted into the design. For example, the system includes functions for communicating with the different types of data movers and/or hardware accelerators (e.g., based on the control protocols of the hardware accelerators).

In one example implementation, the system is capable of retrieving program code templates (e.g., for each hardware accelerator and/or data mover) from a code library where the program code templates are selected based on the metadata described herein for the accelerators and/or data movers. The system is capable of parameterizing the program code templates and compiling the parameterized program code templates to generate the control program code.

In another example implementation, development environment 150 is capable of performing debugging of a user application across multiple subsystems of the heterogeneous device. Debugging may be performed across the different subsystems of the heterogeneous device concurrently. As an example, the user application may be instrumented. The instrumentation may include diagnostic program code inserted into the section of the user design to be executed by the PS, and/or insertion of one or more monitor circuits (e.g., IPs) into the portion of the user design to be implemented in the PL. The monitor circuits are capable of monitoring data transfers in the heterogeneous device between the subsystems and circuit blocks and/or the state of circuit blocks. Each monitor circuit can include an interface (e.g., stream or memory mapped) through which data collected at runtime of the user design is offloaded. Particular events occurring in the DPEs of the DPE array also can be logged in coordination with the other debugging data collected across subsystems.

In another example implementation, the development environment is capable of creating a customized memory hierarchy for a user design implemented in a heterogeneous device. The development environment is capable of facilitating implementation of a user design for a heterogeneous device by generation of a customized memory hierarchy. The memory hierarchy that is generated depends on the user application and, more particularly, on the particular subsystems of the heterogeneous device that are utilized by the user application.

In another example implementation, the development environment is capable of creating customized input/output for a user design implemented in a heterogeneous device. The development environment is capable of facilitating implementation of a user application by generating customized input/output that meets the design requirements of the user application. The customized I/O that is generated depends on the user application and, more particularly, on the particular subsystems of the heterogeneous device that are utilized by the user application.

Figure 5:
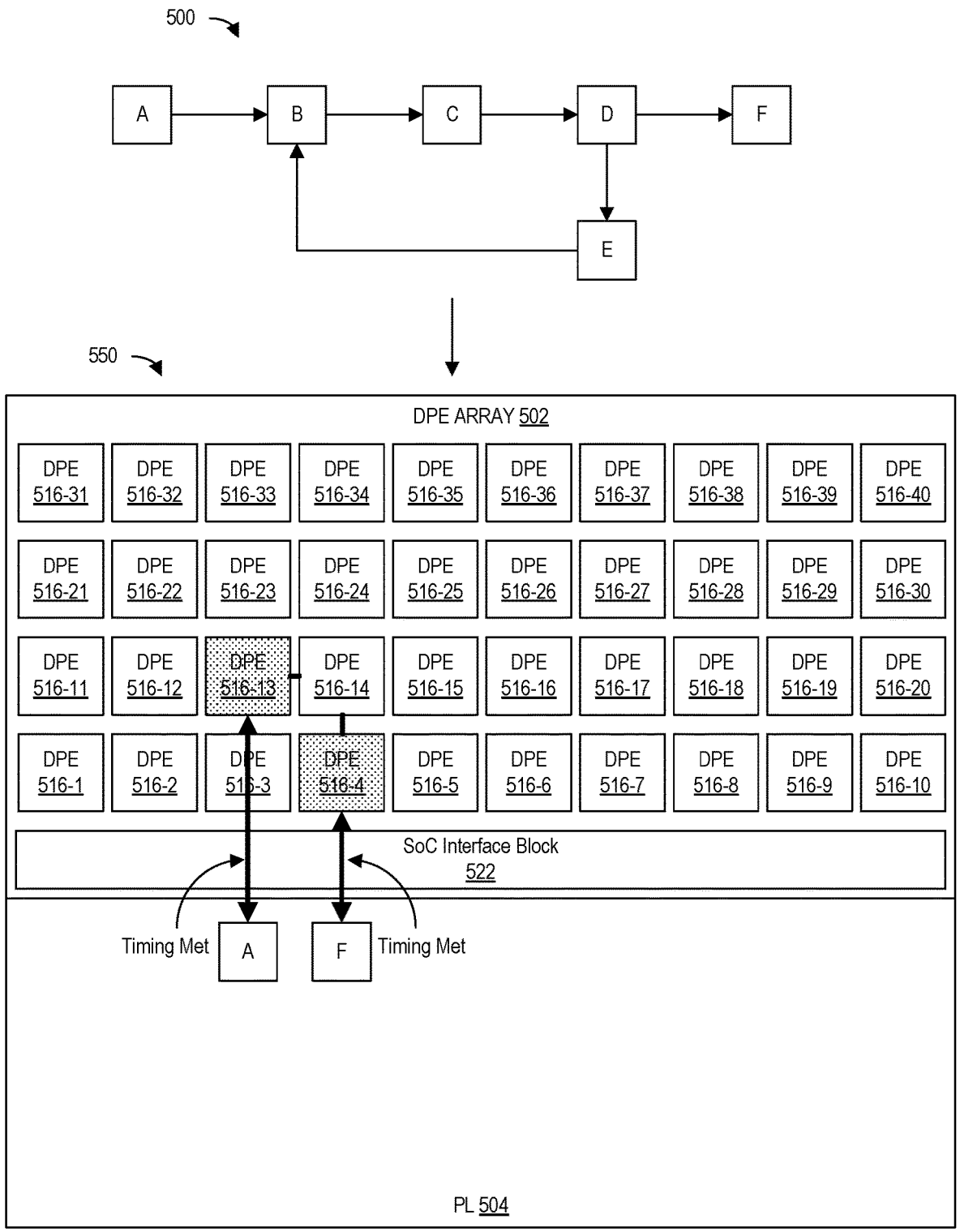
FIG. 5 illustrates an example mapping of a data flow graph (DFG) portion of a user application onto a heterogeneous device.

FIG. 5 illustrates an example of a DFG 500 portion of a user application mapped onto a target device 550 using a system executing the development environment described herein. Target device 550 includes a DPE array 502 having DPEs 516 and an SoC interface block 522. For purposes of illustration, only a subset of the different subsystems of target device 550 are shown. DFG 500 includes nodes A, B, C, D, E, and F having the connectivity shown. Example 1 below illustrates example source code that may be used to specify DFG 500.

Example 1

```
using namespace cardano; // class library with graph
   building primitives class radio:cardano::graph {// an
   example graph class
public:
input_port in;
output_port out;
kernel a,b,c,d,e,f;
radio( ){// graph constructor
a=kernel::create(polarclip);
b=kernel::create(feedback);
c=kernel::create(equalizer);
d=kernel::create(fir_tap11);
e=kernel::create(fir_tap7);
f=kernel::create(scale);
fabric<fpga>(a); fabric<fpga>(f);
runtime<ratio>(b)=0.6; runtime<ratio>(c)=0.2;
runtime<ratio>(d)=0.8; runtime<ratio>(e)=0.1;
connect<stream, window<64,8>>(a.out[0], b.in[0]);
connect<window<32>>(b.out[0], c.in[0]);
connect<window<32, 24>>(c.out[0], d.in[0]);
connect<window<32, 16>>(d.out[1], e.in[0]);
connect<window<32, 8>>(e.out[0], async(b.in[1]));
connect<window<16>, stream>(d.out[0], f.in[0]);
connect<stream>(in, a.in[0]);
connect<stream>(fout[0], out);
}
}
radio mygraph; //top level testbench
simulation::platform<1,1>platform("in.txt", "out.txt");
connect< >net0(platform.src[0], mygraph.in);
connect< >net1(platform.sink[0], mygraph.out);
int main(void) {//control program for PS
   mygraph. init( );
   mygraph. run( );
   mygraph.end( );
   return 0;
   }
```

As illustrated in the source code of Example 1, nodes A and F are designated for implementation in PL 504, while nodes B, C, D, and E are designated for implementation within the DPE array 502. Connectivity of the nodes is specified by the data transfer edges in the source code. The source code of Example 1 also specifies a top level testbench and a control program that is executed in a processor (e.g., a PS).

Returning to FIG. 5, DFG 500 is mapped onto target device 550. As pictured, nodes A and F are mapped onto PL 504. The shaded DPEs 516-13 and 516-14 represent the DPEs 516 onto which nodes B, C, D, and E are mapped. For example, nodes B and C are mapped onto DPE 516-13, while nodes D and E are mapped onto DPE 516-4. Nodes A and F are implemented in the PL 504 and are connected to DPE 516-13 and 516-4 via routing through the PL 504, particular tiles and switches of the SoC interface block 522, switches in the DPE interconnect of intervening DPEs 516, and using particular memories of selected neighboring DPEs 516.

In one aspect, the development environment includes additional compilers capable of generating a binary for DPE 516-13 with the object code for DPE 516-13 to implement the computations corresponding to nodes B and C. The DPE compiler is capable of generating the configuration data to establish data paths between DPEs 516-3, 516-13, 516-14, and 516-4. The additional compilers are also capable of generating a binary for DPE 516-4 that includes the object code for DPE 516-4 to implement the computations corresponding to nodes D and E.

This example illustrates how a placement constraint applied to the locations of nodes B, C, D, and E used by the DPE compiler may also be used by the hardware generator to locate nodes A and F in proximity to nodes B, C, D, and E so that paths from PL 504 crossing SoC interface block 522 do not violate applicable timing constraints. In this example, the hardware generator ensures that nodes A and F are placed in PL 504 close enough to DPEs 516-13 and 516-4 to meet timing constraints for the paths.

Figure 6:
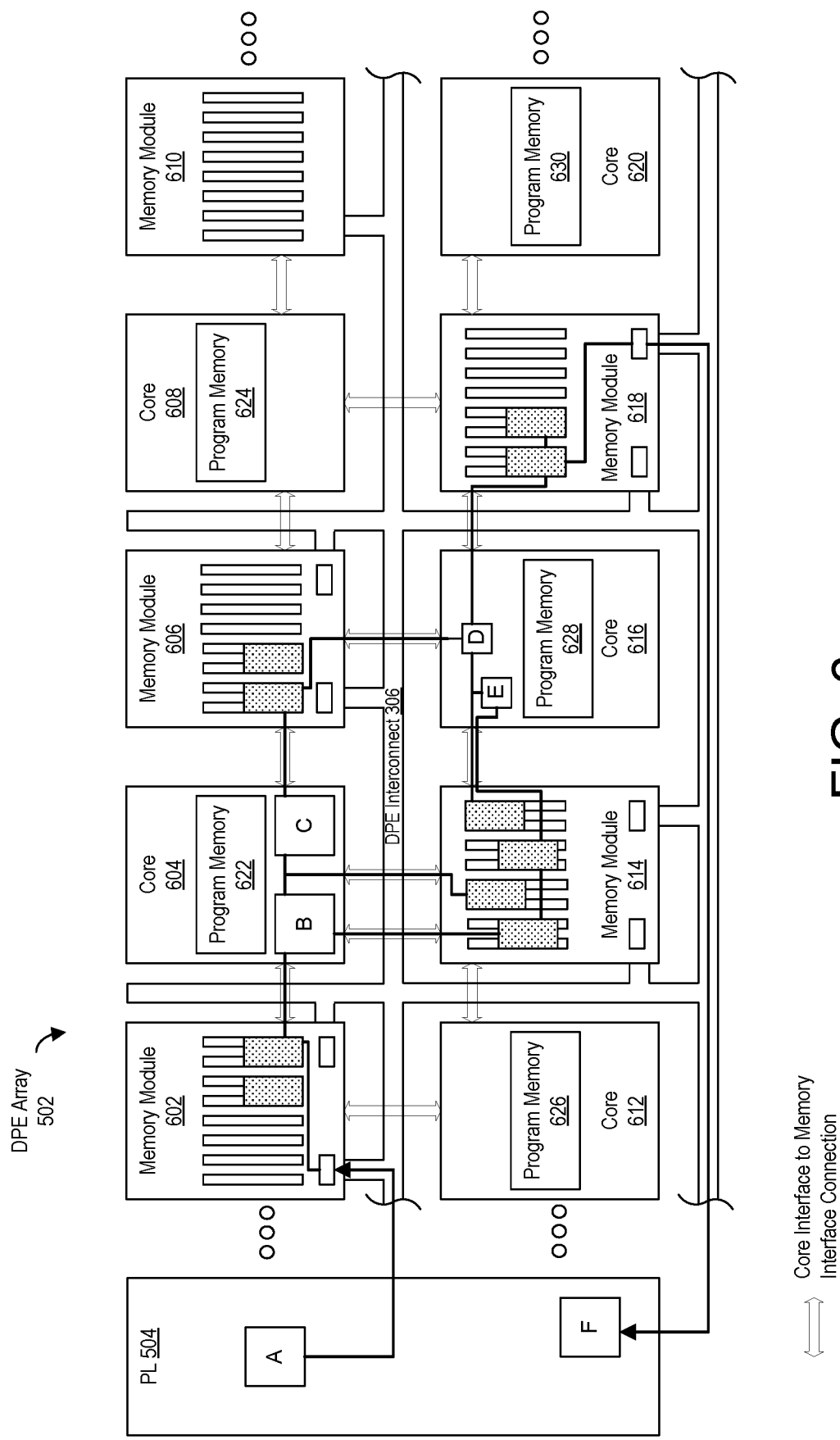
FIG. 6 illustrates another example mapping of a DFG portion of a user application onto a heterogeneous device.

FIG. 6 illustrates another example mapping of DFG 500 onto target device 550. FIG. 6 illustrates an alternative and more detailed example than illustrated in FIG. 5. FIG. 6, for example, illustrates the mapping of nodes of DFG 500 to particular DPEs 516 of the DPE array 502, connectivity established between the DPEs 516 to which nodes of DFG 500 are mapped, the allocation of memory in memory modules of DPEs 516 to nodes of DFG 500, mapping of data transfers to memory and core memory interfaces of DPEs 516 (represented with dual headed arrows) and/or to stream switches in the DPE interconnect, as performed by the DPE compiler.

In the example of FIG. 6, memory modules 602, 606, 610, 614, and 618 are shown along with cores 604, 608, 612, 616, and 620. Cores 604, 608, 612, 616, and 620 include program memories 622, 624, 626, 628, and 630, respectively. In the upper row, core 604 and memory module 606 form a DPE 516, while core 608 and memory module 610 form another DPE 516. In the lower row, memory module 614 and core 616 form a DPE 516, while memory module 618 and core 620 form another DPE 516.

As illustrated, nodes A and F are mapped to PL 504. For purposes of illustration, PL 504 is shown to the right of DPE array 502, though PL 504 may be located below as shown in FIG. 5. Node A is connected to memory banks (e.g., shaded portions of memory banks) in memory module 602 by way of stream switches and an arbiter in memory module 602. Nodes B and C are mapped to core 604. Instructions for implementing nodes B and C are stored in program memory 622. Nodes D and E are mapped to core 616, with instructions for implementing nodes D and E stored in program memory 628. Node B is allocated and accesses the shaded portions of memory banks in memory module 602 via the core-memory interfaces, while node C is allocated and accesses the shaded portions of memory banks in memory module 606 via the core-memory interfaces. Nodes B, C, and E are allocated and capable of accessing the shaded portions of memory banks in memory module 614 via the core-memory interfaces. Node D is capable of accessing the shaded portions of memory banks in memory module 618 via the core-memory interfaces. Node F is connected to memory module 618 via an arbiter and stream switches.

FIG. 6 illustrates that connectivity between nodes of the application may be implemented using memory and/or core interfaces sharing memories among cores and using the programmable DPE interconnect circuitry. In one aspect, the DPE compiler is capable of generating the configuration data that programs the control registers to implement the connections shown in FIG. 6.

Figure 7:
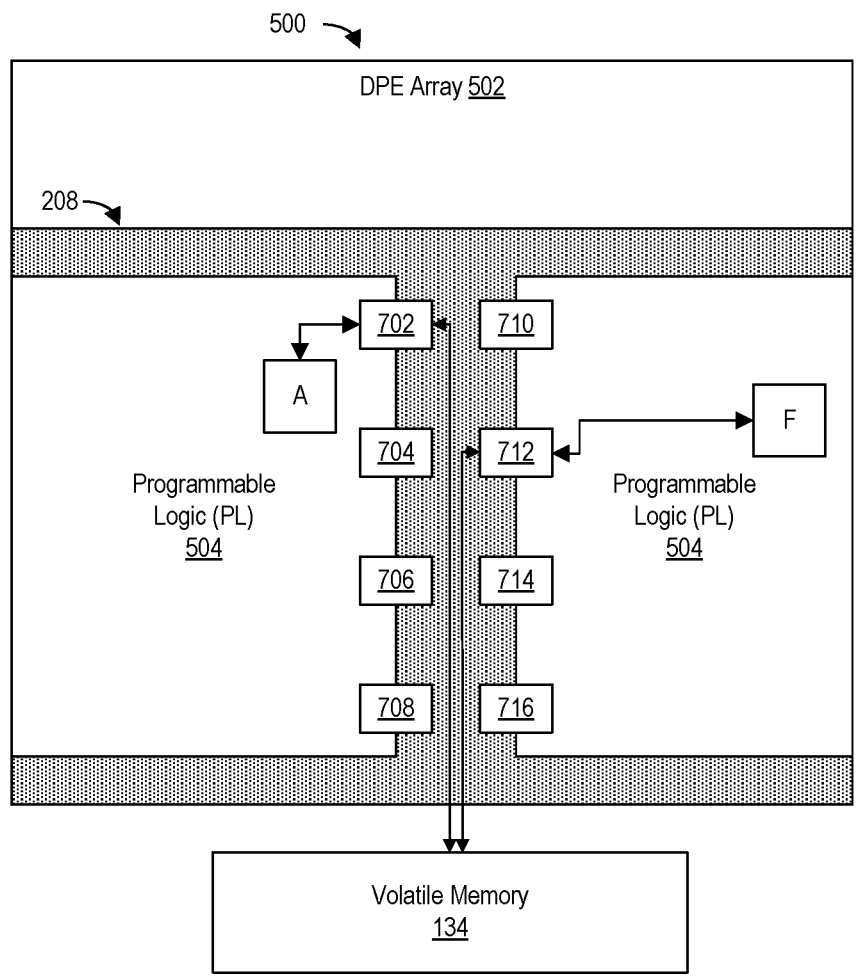
FIG. 7 illustrates an example implementation of programmable logic nodes within a heterogeneous device.

FIG. 7 illustrates another example implementation of nodes A and F within target device 550. For purposes of illustration, only a subset of the different subsystems of target device 550 are shown. In this example, connections to nodes A and F, each being implemented in PL 504, are routed through NoC 208. NoC 208 includes ingress/egress points 702, 704, 706, 708, 710, 712, 714, and 716. The example of FIG. 7 illustrates the case where node A is placed relatively close to ingress/egress point 702, while node F is placed relatively close to ingress/egress point 712. The hardware generator is capable of balancing the requirement for node F to communicate with DPE array 502 and to access volatile memory 134 to select an ingress/egress point, e.g., 712 as opposed to 718 which results in a longer route through PL 504, that meets both timing constraints.

Figure 8:
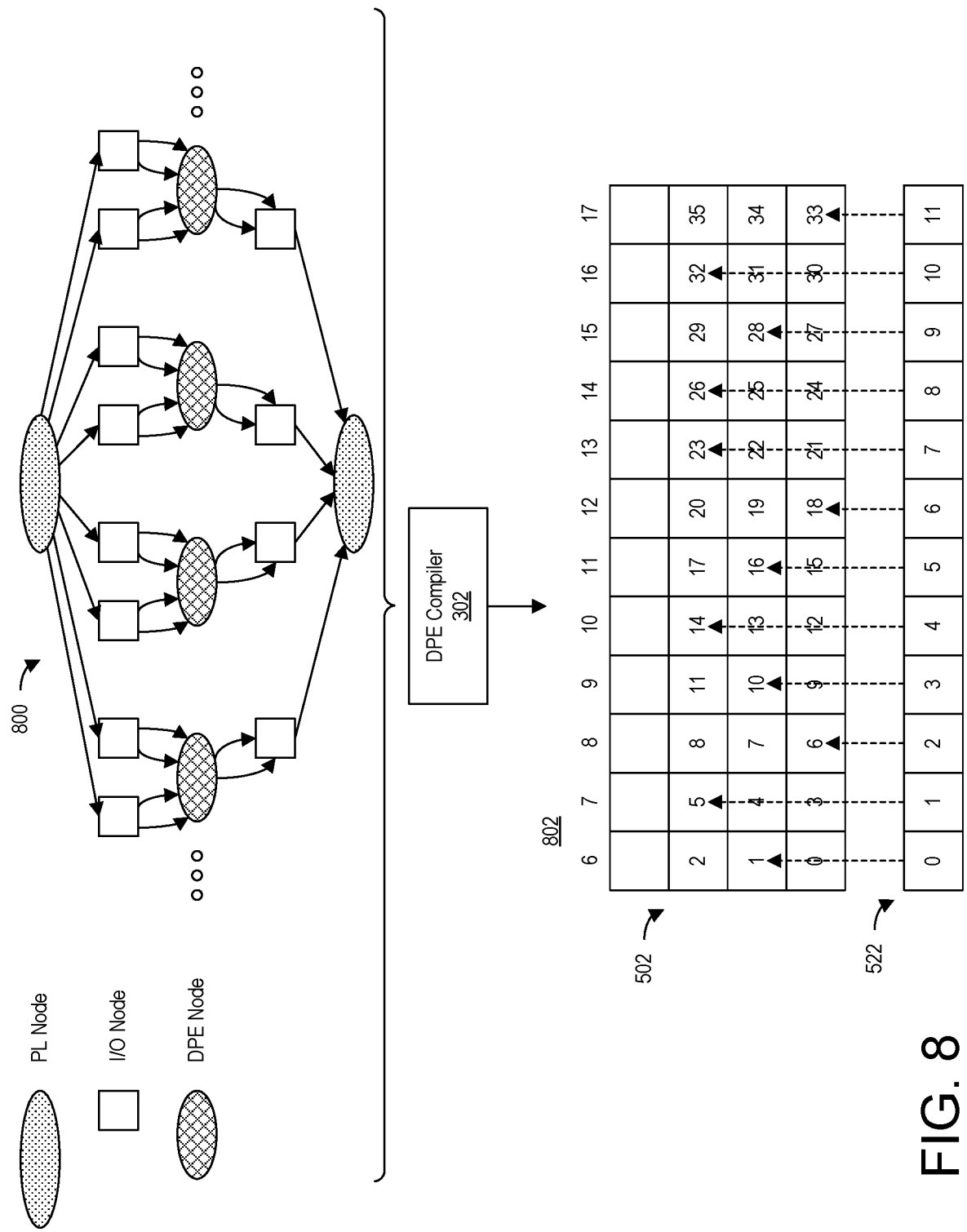
FIG. 8 illustrates an example mapping of a DFG onto a data processing engine (DPE) array of a heterogeneous device.

FIG. 8 illustrates another example of a DFG 800 for implementation in DPE array 502. Nodes are shaded and shaped differently to distinguish between PL nodes, DPE nodes, and I/O nodes. For ease discussion, nodes designated for implementation in DPE array 502 are referred to as DPE nodes. Nodes designated for implementation in PL are referred to as PL nodes. In the example shown, the I/O nodes may be mapped onto SoC interface block 522. The PL nodes are implemented in the PL. The DPE nodes are mapped to particular DPEs. Though not shown in its entirety, DFG 800 includes 36 kernels (e.g., nodes) to be mapped to DPEs, 72 PL to DPE array data streams, and 36 DPE array to PL data streams.

DPE compiler 302 is capable of generating a DPE accelerator representation 802. DPE accelerator representation 802 specifies a mapping of DPE nodes of DFG 800 to DPEs 516 of DPE array 502 and a mapping of data streams to SoC interface block 522 hardware. The mapping of DPE nodes 0-35 of DFG 800 to DPEs 514, as determined by DPE compiler 302, is shown with reference to DPE array 502. The mapping of data streams between the DPEs and particular tiles of SoC interface block 522 is shown as a collection of arrows. In one aspect, DPE compiler 302 may be configured to attempt, at least initially, to use vertical routes for the SoC interface block 522 as shown before attempting to use other routes that traverse along (e.g., left to right) a row of DPEs from one column to another.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions, or program instructions, for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method can include receiving an application specifying a plurality of hardware accelerators and having a plurality of sections corresponding to different subsystems of a heterogeneous device, wherein the plurality of sections are specified using different programming models. The method can include compiling each section into an accelerator representation based on the programming model of the section and the subsystem of the heterogeneous device corresponding to the section. The method also can include linking the accelerator representations based on a platform of the heterogeneous device, generating, using a processor, a hardware implementation of the application for the heterogeneous device based on the linked accelerator implementations, and automatically generating, using the processor, program code configured to control one or more of the plurality of hardware accelerators of the hardware implementation.

The foregoing and other implementations can each optionally include one or more of the following features, alone or in combination. One example implementation includes all the following features in combination.

In another aspect, the method includes allocating resources of the heterogeneous device among the plurality of hardware accelerators for the compiling.

In another aspect, each section can be compiled using a different compiler and each compiler uses a subset of available resources of the heterogeneous device based on the allocating.

In another aspect, the resources include connections to an off-chip memory.

In another aspect, the platform and metadata corresponding to the plurality of hardware accelerators are used to generate control program code for the plurality of hardware accelerators.

In another aspect, the metadata for the plurality of hardware accelerators specifies a selected control protocol from a plurality of control protocols used by a selected hardware accelerator of the plurality of hardware accelerators. In that case, the method can include generating the program code to control the selected hardware accelerator based, at least in part, on the selected control protocol.

In another aspect, a first section of the application includes one or more selected hardware accelerators of the plurality of hardware accelerators and corresponds to a data processing engine array subsystem of the heterogeneous device. A second section of the application includes one or more other selected hardware accelerators of the plurality of hardware accelerators and corresponds to a programmable logic subsystem of the heterogeneous device.

In another aspect, the method includes receiving a directive for the application and using the directive in the compiling of at least one section of the plurality of sections of the application and in the generating the hardware implementation of the application.

In another aspect, the method can include selecting particular types of data movers for inclusion in the application based, at least in part, on data flows between a host processor and the plurality of hardware accelerators and inserting the data movers of the selected types into the application. The generating the program code is performed based, at least in part, the selected types of data movers inserted into the application.

A system can include a processor configured to initiate operations. The operations include receiving an application specifying a plurality of hardware accelerators and having a plurality of sections corresponding to different subsystems of a heterogeneous device, wherein the plurality of sections are specified using different programming models. The operations include compiling each section into an accelerator representation based on the programming model of the section and the subsystem of the heterogeneous device corresponding to the section. The operations also can include linking the accelerator representations based on a platform of the heterogeneous device, generating a hardware implementation of the application for the heterogeneous device based on the linked accelerator implementations, and automatically generating program code configured to control one or more of the plurality of hardware accelerators of the hardware implementation.

The foregoing and other implementations can each optionally include one or more of the following features, alone or in combination. One example implementation includes all the following features in combination.

In another aspect, the operations include allocating resources of the heterogeneous device among the plurality of hardware accelerators for the compiling.

In another aspect, each section is compiled using a different compiler and each compiler uses a subset of available resources of the heterogeneous device based on the allocating.

In another aspect, the resources include connections to an off-chip memory.

In another aspect, the platform and metadata corresponding to the plurality of hardware accelerators are used to generate control program code for the plurality of hardware accelerators.

In another aspect, the metadata for the plurality of hardware accelerators specifies a selected control protocol from a plurality of control protocols used by a selected hardware accelerator of the plurality of hardware accelerators. In that case, the operations include generating the program code to control the selected hardware accelerator based, at least in part, on the selected control protocol.

In another aspect, a first section of the application includes one or more selected hardware accelerators of the plurality of hardware accelerators and corresponds to a data processing engine array subsystem of the heterogeneous device. A second section of the application includes one or more other selected hardware accelerators of the plurality of hardware accelerators and corresponds to a programmable logic subsystem of the heterogeneous device.

In another aspect, the operations include receiving a directive for the application and using the directive in the compiling of at least one section of the plurality of sections of the application and in the generating the hardware implementation of the application.

In another aspect, the operations include selecting particular types of data movers for inclusion in the application based, at least in part, on data flows between a host processor and the plurality of hardware accelerators and inserting the data movers of the selected types into the application. In that case, the generating the program code is performed based, at least in part, the selected types of data movers inserted into the application.

A computer program product can include one or more computer readable storage media, and program instructions collectively stored on the one or more computer readable storage media. The program instructions are executable by computer hardware to initiate operations as described herein in any combination.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   receiving an application specifying a plurality of hardware accelerators and having a plurality of sections corresponding to different subsystems of a heterogeneous device, wherein the plurality of sections are specified using different programming models;
   compiling each section into an accelerator representation based on the programming model of the section and the subsystem of the heterogeneous device corresponding to the section;
   linking the accelerator representations based on a platform of the heterogeneous device;
   generating, using a processor, a hardware implementation of the application for the heterogeneous device based on the linked accelerator implementations; and
   automatically generating, using the processor, program code configured to control one or more of the plurality of hardware accelerators of the hardware implementation.

2. The method of claim 1, further comprising:
   allocating resources of the heterogeneous device among the plurality of hardware accelerators for the compiling.

3. The method of claim 2, wherein each section is compiled using a different compiler and each compiler uses a subset of available resources of the heterogeneous device based on the allocating.

4. The method of claim 2, wherein the resources include connections to an off-chip memory.

5. The method of claim 1, wherein the platform and metadata corresponding to the plurality of hardware accelerators are used to generate control program code for the plurality of hardware accelerators.

6. The method of claim 5, wherein the metadata for the plurality of hardware accelerators specifies a selected control protocol from a plurality of control protocols used by a selected hardware accelerator of the plurality of hardware accelerators, the method further comprising:
   generating the program code to control the selected hardware accelerator based, at least in part, on the selected control protocol.

7. The method of claim 1, wherein:
   a first section of the application includes one or more selected hardware accelerators of the plurality of hardware accelerators and corresponds to a data processing engine array subsystem of the heterogeneous device; and
   a second section of the application includes one or more other selected hardware accelerators of the plurality of hardware accelerators and corresponds to a programmable logic subsystem of the heterogeneous device.

8. The method of claim 1, further comprising:
   receiving a directive for the application; and
   using the directive in the compiling of at least one section of the plurality of sections of the application and in the generating the hardware implementation of the application.

9. The method of claim 1, further comprising:
   selecting particular types of data movers for inclusion in the application based, at least in part, on data flows between a host processor and the plurality of hardware accelerators;
   inserting the data movers of the selected types into the application; and
   wherein the generating the program code is performed based, at least in part, the selected types of data movers inserted into the application.

10. A system, comprising:
    a processor configured to initiate operations including:
    receiving an application specifying a plurality of hardware accelerators and having a plurality of sections corresponding to different subsystems of a heterogeneous device, wherein the plurality of sections are specified using different programming models;
    compiling each section into an accelerator representation based on the programming model of the section and the subsystem of the heterogeneous device corresponding to the section;
    linking the accelerator representations based on a platform of the heterogeneous device;
    generating a hardware implementation of the application for the heterogeneous device based on the linked accelerator implementations; and
    automatically generating program code configured to control one or more of the plurality of hardware accelerators of the hardware implementation.

11. The system of claim 10, wherein the processor is configured to initiate operations further comprising:
    allocating resources of the heterogeneous device among the plurality of hardware accelerators for the compiling.

12. The system of claim 11, wherein each section is compiled using a different compiler and each compiler uses a subset of available resources of the heterogeneous device based on the allocating.

13. The system of claim 11, wherein the resources include connections to an off-chip memory.

14. The system of claim 10, wherein metadata corresponding to the platform and the plurality of hardware accelerators is used to generate control program code for the plurality of hardware accelerators.

15. The system of claim 14, wherein the metadata for the plurality of hardware accelerators specifies a selected control protocol from a plurality of control protocols used by a selected hardware accelerator of the plurality of hardware accelerators, and wherein the processor is configured to initiate operations further comprising:

generating the program code to control the selected hardware accelerator based, at least in part, on the selected control protocol.

16. The system of claim 10, wherein:

a first section of the application includes one or more selected hardware accelerators of the plurality of hardware accelerators and corresponds to a data processing engine array subsystem of the heterogeneous device; and a second section of the application includes one or more other selected hardware accelerators of the plurality of hardware accelerators and corresponds to a programmable logic subsystem of the heterogeneous device.

17. The system of claim 10, wherein the processor is configured to initiate operations further comprising:

receiving a directive for the application; and using the directive in the compiling of at least one section of the plurality of sections of the application and in the generating the hardware implementation of the application.

18. The system of claim 10, wherein the processor is configured to initiate operations further comprising:

selecting particular types of data movers for inclusion in the application based, at least in part, on data flows between a host processor and the plurality of hardware accelerators;

inserting the data movers of the selected types into the application; and wherein the generating the program code is performed based, at least in part, the selected types of data movers inserted into the application.

19. A computer program product, comprising:

one or more computer readable storage media, and program instructions collectively stored on the one or more computer readable storage media, wherein the program instructions are executable by computer hardware to initiate operations including:

receiving an application specifying a plurality of hardware accelerators and having a plurality of sections corresponding to different subsystems of a heterogeneous device, wherein the plurality of sections are specified using different programming models;

compiling each section into an accelerator representation based on the programming model of the section and the subsystem of the heterogeneous device corresponding to the section;

linking the accelerator representations based on a platform of the heterogeneous device;

generating a hardware implementation of the application for the heterogeneous device based on the linked accelerator implementations; and automatically generating program code configured to control one or more of the plurality of hardware accelerators of the hardware implementation.

20. The computer program product of claim 19, wherein the operations further include:

allocating resources of the heterogeneous device among the plurality of hardware accelerators for the compiling; and wherein each section is compiled using a different compiler and each compiler uses a subset of available resources of the heterogeneous device based on the allocating.

* * * * *